US012259512B2

United States Patent
Geerits et al.

(10) Patent No.: US 12,259,512 B2
(45) Date of Patent: Mar. 25, 2025

(54) MULTIPOLE SHEAR WAVE SPLITTING

(71) Applicant: Baker Hughes Oilfield Operations LLC, Houston, TX (US)

(72) Inventors: Theodorus Geerits, Nienhagen (DE); Anna Swiatek, Celle (DE); Stefan Schimschal, Celle (DE); Christoph Demmler, Celle (DE)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 140 days.

(21) Appl. No.: 17/889,786

(22) Filed: Aug. 17, 2022

(65) Prior Publication Data

US 2023/0161063 A1    May 25, 2023

Related U.S. Application Data

(60) Provisional application No. 63/235,227, filed on Aug. 20, 2021.

(51) Int. Cl.
    *G01V 1/30* (2006.01)
    *E21B 44/00* (2006.01)
    *G01V 1/28* (2006.01)

(52) U.S. Cl.
    CPC ............ *G01V 1/306* (2013.01); *E21B 44/005* (2013.01); *G01V 1/284* (2013.01); *G01V 2210/626* (2013.01); *G01V 2210/646* (2013.01)

(58) Field of Classification Search
    CPC ......... G01V 2210/47; G01V 2210/646; G01V 2210/626; G01V 2200/16; G01V 1/284; G01V 1/306
    See application file for complete search history.

(56) References Cited

U.S. PATENT DOCUMENTS

| 7,623,412 B2 * | 11/2009 | Pabon | G01V 1/50 |
| | | | 702/9 |
| 10,859,726 B2 * | 12/2020 | Oshima | G01V 1/52 |

(Continued)

OTHER PUBLICATIONS

International Search Report for PCT/US2022/040758; Date of Search: Dec. 6, 2022; 4 pages.

(Continued)

*Primary Examiner* — Luke D Ratcliffe
*Assistant Examiner* — Christopher Richard Walker
(74) *Attorney, Agent, or Firm* — CANTOR COLBURN LLP

(57) ABSTRACT

Downhole measurement systems and methods include deploying a bottomhole assembly having a multipole transmitter into a formation and transmitting acoustic signals into the formation. The multipole transmitter is of order n≥2. Acoustic signals are received at respective receivers that are circumferentially aligned with the multipole transmitter, and are axially offset from the multipole transmitter, and axially offset from each other. The order of the first and second multipole receivers are equal to the order of the multipole transmitter. A controller is used to obtain first and second acoustic multipole data from the first and second multipole receivers at one or more azimuthal angles of a rotation of the bottomhole assembly in a formation during a drilling operation. Acoustic azimuthal anisotropy of the formation is determined from the first acoustic multipole data and the second acoustic multipole data.

20 Claims, 14 Drawing Sheets

(56) References Cited

U.S. PATENT DOCUMENTS

| | | | |
|---|---|---|---|
| 2006/0198242 A1* | 9/2006 | Geerits | G01V 1/46 367/25 |
| 2012/0069713 A1* | 3/2012 | Geerits | E21B 47/095 367/99 |
| 2014/0195160 A1 | 7/2014 | Collins et al. | |
| 2015/0109886 A1* | 4/2015 | Mekic | G01V 1/284 367/25 |
| 2017/0285206 A1* | 10/2017 | Sakiyama | G01V 1/50 |
| 2017/0329031 A1* | 11/2017 | Collins | G01V 1/50 |
| 2018/0003843 A1* | 1/2018 | Hori | G01V 1/52 |
| 2018/0003845 A1 | 1/2018 | Sakiyama et al. | |
| 2018/0031723 A1 | 2/2018 | Przebindowska et al. | |
| 2019/0129053 A1* | 5/2019 | Wang | G01V 1/284 |
| 2019/0330981 A1 | 10/2019 | Lei et al. | |

OTHER PUBLICATIONS

Written Opinion for PCT/US2022/040758; Date of Search: Dec. 6, 2022; 5 pages.

* cited by examiner

MULTIPOLE SHEAR WAVE SPLITTING

CROSS REFERENCE TO RELATED APPLICATION

This application claims the benefit of an earlier filing date from U.S. Provisional Application Ser. No. 63/235,227, filed Aug. 20, 2021, the entire disclosure of which is incorporated herein by reference

BACKGROUND

1. Field of the Invention

The present invention generally relates to downhole components and sensors for determining fracture structure of downhole formations.

2. Description of the Related Art

Boreholes are drilled deep into the earth for many applications such as carbon dioxide sequestration, geothermal production, and hydrocarbon exploration and production. In all of the applications, the boreholes are drilled such that they pass through or allow access to a material (e.g., a gas or fluid) contained in a formation located below the earth's surface. Different types of tools and instruments may be disposed in the boreholes to perform various tasks and measurements.

Identifying anisotropic (HTI/TTI) intervals in downhole or subsurface formations and principal shear slownesses (fast and slow) can aid in seismic processing. Further, such information may be used to determine dip angle, fracture strike, maximum and/or minimum principal stress direction(s), and other factors that may be important for well completion, as will be appreciated by those of skill in the art. During drilling operations, it has proven difficult to measure or determine such properties in slow formations. A slow formation is a formation in which a velocity of a compressional wave traveling through a borehole fluid is greater than a velocity of a shear wave through a surrounding formation. That is, the waves travel faster within the borehole (or drilling fluids) than within the formation itself. Using dipole while-drilling systems is insufficient for such determinations because these systems cannot measure acoustic low frequency flexural modes, and thus cannot measure true slow principal shear wave. Modeling may be used with dipole measurements to make estimates, but such estimates are not sufficiently accurate or representative of the actual principal shear slowness of the formation. Although wireline systems have been developed to make more accurate measurements, the wireline systems suffer from various drawbacks, including time and complexity considerations.

SUMMARY

Disclosed herein are downhole measurement systems. The systems include a bottomhole assembly configured to drill through a formation and a sensor assembly. The sensor assembly includes a multipole transmitter configured to transmit acoustic signals into the formation, the multipole transmitter located at an azimuthal position on an exterior of the bottomhole assembly, wherein the multipole transmitter is of order n≥2 and a first multipole receiver and a second multipole receiver, wherein each of the first and second multipole receivers are azimuthally aligned with the multipole transmitter, are axially offset from the multipole transmitter, and are axially offset from each other along the exterior of the bottomhole assembly, wherein the order of the first and second multipole receivers are equal to the order of the multipole transmitter. A controller is configured to obtain acoustic multipole data from each of the first multipole receiver and the second multipole receiver at one or more azimuthal angles of the bottomhole assembly during a drilling operation. The controller is configured to determine acoustic azimuthal anisotropy of the formation from the acoustic multipole data.

Disclosed herein are methods for making measurements downhole. The methods include deploying a bottomhole assembly into a formation and transmitting, using a multipole transmitter, acoustic signals into the formation, the multipole transmitter located at an azimuthal position on an exterior of the bottomhole assembly, wherein the multipole transmitter is of order n≥2. The method further includes receiving, at a first multipole receiver and a second multipole receiver, acoustic waves, wherein each of the first and second multipole receivers are azimuthally aligned with the multipole transmitter, are axially offset from the multipole transmitter, and are axially offset from each other along the exterior of the bottomhole assembly, wherein the order of the first and second multipole receivers are equal to the order of the multipole transmitter and obtaining acoustic multipole data from each of the first multipole receiver and the second multipole receiver at one or more predefined azimuthal angles of the bottomhole assembly during a drilling operation. From the acoustic multipole data, acoustic azimuthal anisotropy of the formation is determined.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

DETAILED DESCRIPTION

Figure 1:
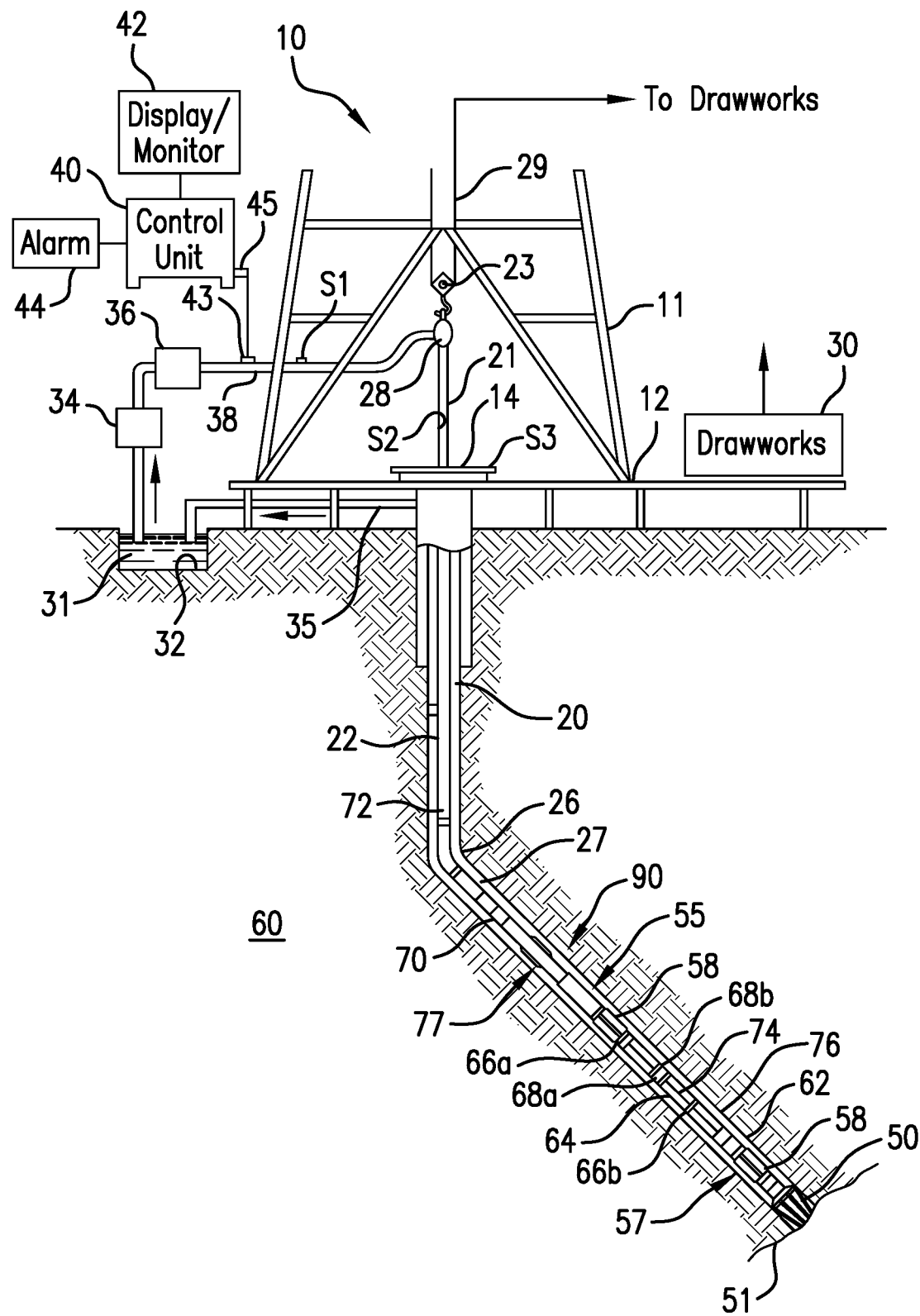
FIG. 1 is an example of a system for performing downhole operations that can employ embodiments of the present disclosure.

FIG. 1 shows a schematic diagram of a system for performing downhole operations. As shown, the system is a drilling system 10 that includes a drill string 20 having a drilling assembly 90, also referred to as a bottomhole assembly (BHA), conveyed in a borehole 26 penetrating an earth formation 60. The drilling system 10 includes a conventional derrick 11 erected on a floor 12 that supports a rotary table 14 that is rotated by a prime mover, such as an electric motor (not shown), at a desired rotational speed. The drill string 20 includes a drilling tubular 22, such as a drill pipe, extending downward from the rotary table 14 into the borehole 26. A disintegrating tool 50, such as a drill bit attached to the end of the BHA 90, disintegrates the geological formations when it is rotated to drill the borehole 26. The drill string 20 is coupled to surface equipment such as systems for lifting, rotating, and/or pushing, including, but not limited to, a drawworks 30 via a kelly joint 21, swivel 28 and line 29 through a pulley 23. In some embodiments, the surface equipment may include a top drive (not shown). During the drilling operations, the drawworks 30 is operated to control the weight on bit, which affects the rate of penetration. The operation of the drawworks 30 is well known in the art and is thus not described in detail herein.

During drilling operations, a suitable drilling fluid 31 (also referred to as the "mud") from a source or mud pit 32 is circulated under pressure through the drill string 20 by a mud pump 34. The drilling fluid 31 passes into the drill string 20 via a desurger 36, fluid line 38 and the kelly joint 21. The drilling fluid 31 is discharged at the borehole bottom 51 through an opening in the disintegrating tool 50. The drilling fluid 31 circulates uphole through the annular space 27 between the drill string 20 and the borehole 26 and returns to the mud pit 32 via a return line 35. A sensor S1 in the line 38 provides information about the fluid flow rate. A surface torque sensor S2 and a sensor S3 associated with the drill string 20 respectively provide information about the torque and the rotational speed of the drill string. Additionally, one or more sensors (not shown) associated with line 29 are used to provide the hook load of the drill string 20 and about other desired parameters relating to the drilling of the borehole 26. The system may further include one or more downhole sensors 70 located on the drill string 20 and/or the BHA 90.

In some applications the disintegrating tool 50 is rotated by only rotating the drill pipe 22. However, in other applications, a drilling motor 55 (mud motor) disposed in the drilling assembly 90 is used to rotate the disintegrating tool 50 and/or to superimpose or supplement the rotation of the drill string 20. In either case, the rate of penetration (ROP) of the disintegrating tool 50 into the borehole 26 for a given formation and a drilling assembly largely depends upon the weight on bit and the drill bit rotational speed. In one aspect of the embodiment of FIG. 1, the mud motor 55 is coupled to the disintegrating tool 50 via a drive shaft (not shown) disposed in a bearing assembly 57. The mud motor 55 rotates the disintegrating tool 50 when the drilling fluid 31 passes through the mud motor 55 under pressure. The bearing assembly 57 supports the radial and axial forces of the disintegrating tool 50, the downthrust of the drilling motor and the reactive upward loading from the applied weight on bit. Stabilizers 58 coupled to the bearing assembly 57 and other suitable locations act as centralizers for the lowermost portion of the mud motor assembly and other such suitable locations.

A surface control unit 40 receives signals from the downhole sensors 70 and devices via a transducer 43, such as a pressure transducer, placed in the fluid line 38 as well as from sensors S1, S2, S3, hook load sensors, RPM sensors, torque sensors, and any other sensors used in the system and processes such signals according to programmed instructions provided to the surface control unit 40. The surface control unit 40 displays desired drilling parameters and other information on a display/monitor 42 for use by an operator at the rig site to control the drilling operations. The surface control unit 40 contains a computer, memory for storing data, computer programs, models, and algorithms accessible to a processor in the computer, a recorder, such as tape unit, memory unit, etc. for recording data and other peripherals. The surface control unit 40 also may include simulation models for use by the computer to processes data according to programmed instructions. The control unit responds to user commands entered through a suitable device, such as a keyboard. The control unit 40 is adapted to activate alarms 44 when certain unsafe or undesirable operating conditions occur.

The drilling assembly 90 also contains other sensors and devices or tools for providing a variety of measurements relating to the formation surrounding the borehole and for drilling the borehole 26 along a desired path. Such devices may include a device for measuring the formation resistivity near and/or in front of the drill bit, a gamma ray device for measuring the formation gamma ray intensity and devices for determining the inclination, azimuth of the borehole, and position of the drill string (e.g., inclination, azimuth, and tool face). The azimuth of the borehole defines the direction of the borehole in a plane parallel to the earth surface. The tool face relates to the rotational or angular orientation of the drill string relative to the borehole. The drill string includes a tool body mark. The tool body mark rotates with the drill string in the borehole (formation) relative to a reference azimuthal angle of the formation. The rotational position of the tool body mark on the drill string relative to the reference azimuth defines the tool face of the drill string in the borehole (formation). A formation resistivity tool 64, made according an embodiment described herein may be coupled at any suitable location, including above a lower kick-off subassembly 62, for estimating or determining the resistivity of the formation near or in front of the disintegrating tool 50 or at other suitable locations. An inclinometer 74 and a gamma ray device 76 may be suitably placed for respectively determining the inclination of the BHA and the formation gamma ray intensity. Any suitable inclinometer and gamma ray device may be utilized. In addition, an azimuth measuring device (not shown), such as a magnetometer or a gyroscopic device, may be utilized to determine the drill string azimuth of the borehole and/or the rotational orientation of the drill string in the borehole (tool face). Such devices are known in the art and therefore are not described in detail herein. In the above-described exemplary configuration, the mud motor 55 transfers rotational power to the disintegrating tool 50 via a hollow shaft that also enables the drilling fluid to pass from the mud motor 55 to the disintegrating tool 50. In an alternative embodiment of the drill string 20, the mud motor 55 may be coupled below the resistivity measuring device 64 or at any other suitable place.

Still referring to FIG. 1, other logging-while-drilling (LWD) devices (generally denoted herein by numeral 77), such as devices for measuring formation porosity, permeability, density, rock properties, fluid properties, etc. may be placed at suitable locations in the drilling assembly 90 for providing information useful for evaluating the subsurface formations along borehole 26. Such devices may include, but are not limited to, temperature measurement tools, pressure measurement tools, borehole diameter measuring tools (e.g., a caliper), acoustic tools, nuclear tools, nuclear magnetic resonance tools and formation testing and sampling tools.

The above-noted devices transmit data to a downhole telemetry system 72, which in turn transmits the received data uphole to the surface control unit 40. The downhole telemetry system 72 also receives signals and data from the surface control unit 40 including a transmitter and transmits such received signals and data to the appropriate downhole devices. In one aspect, a mud pulse telemetry system may be used to communicate data between the downhole sensors 70 and devices and the surface equipment during drilling operations. A transducer 43 placed in the mud supply line 38 detects the mud pulses responsive to the data transmitted by the downhole telemetry 72. Transducer 43 generates electrical signals in response to the mud pressure variations and transmits such signals via a conductor 45 to the surface control unit 40. In other aspects, any other suitable telemetry system may be used for two-way data communication (e.g., downlink and uplink) between the surface and the BHA 90, including but not limited to, an acoustic telemetry system, an electro-magnetic telemetry system, an optical telemetry system, a wired pipe telemetry system which may utilize wireless couplers or repeaters in the drill string or the borehole. The wired pipe may be made up by joining drill pipe sections, wherein each pipe section includes a data communication link that runs along the pipe. The data connection between the pipe sections may be made by any suitable method, including but not limited to, hard electrical or optical connections, induction, capacitive, resonant coupling, or directional coupling methods. In case a coiled-tubing is used as the drill pipe 22, the data communication link may be run along a side of the coiled-tubing.

The drilling system described thus far relates to those drilling systems that utilize a drill pipe to conveying the drilling assembly 90 into the borehole 26, wherein the weight on bit is controlled from the surface, typically by controlling the operation of the draw works. However, a large number of the current drilling systems, especially for drilling highly deviated and horizontal boreholes, utilize coiled-tubing for conveying the drilling assembly downhole. In such application a thruster is sometimes deployed in the drill string to provide the desired force on the drill bit. Also, when coiled-tubing is utilized, the tubing is not rotated by a rotary table but instead it is injected into the borehole by a suitable injector while the downhole motor, such as mud motor 55, rotates the disintegrating tool 50. For offshore drilling, an offshore rig or a vessel is used to support the drilling equipment, including the drill string.

Still referring to FIG. 1, a resistivity tool 64 may be provided that includes, for example, a plurality of antennas including, for example, transmitters 66a or 66b and/or receivers 68a or 68b. Resistivity can be one formation property that is of interest in making drilling decisions. Those of skill in the art will appreciate that other formation property tools can be employed with or in place of the resistivity tool 64.

Liner drilling can be one configuration or operation used for providing a disintegrating device becomes more and more attractive in the oil and gas industry as it has several advantages compared to conventional drilling. One example of such configuration is shown and described in commonly owned U.S. Pat. No. 9,004,195, entitled "Apparatus and Method for Drilling a Borehole, Setting a Liner and Cementing the Borehole During a Single Trip," which is incorporated herein by reference in its entirety. Importantly, despite a relatively low rate of penetration, the time of getting the liner to target is reduced because the liner is run in-hole while drilling the borehole simultaneously. This may be beneficial in swelling formations where a contraction of the drilled well can hinder an installation of the liner later on. Furthermore, drilling with liner in depleted and unstable reservoirs minimizes the risk that the pipe or drill string will get stuck due to hole collapse.

Although FIG. 1 is shown and described with respect to a drilling operation, those of skill in the art will appreciate that similar configurations, albeit with different components, can be used for performing different downhole operations. For example, wireline, coiled tubing, and/or other configurations can be used as known in the art. Further, production configurations can be employed for extracting and/or injecting materials from/into earth formations. Thus, the present disclosure is not to be limited to drilling operations but can be employed for any appropriate or desired downhole operation(s).

In logging-while-drilling (LWD) operations, it has proven difficult to obtain fast and slow principal shear wave slowness and accompanying directions of fast principal shear wave anisotropy angle and slow principal shear wave anisotropy angle in an anisotropic (horizontal transversely isotropic (HTI) and/or tilted transversely isotropic (TTI) and/or vertical transversely isotropic (VTI)) environment. The fast and slow principal shear wave slowness is also referred to as fast and slow principal shear slowness, fast and slow formation shear slowness, fast and slow shear slowness, or fast and slow slowness. The fast and slow principal shear wave anisotropy angle is also referred to as fast and slow principal shear angle, fast and slow shear angle, or fast and slow angle. The term fast angle, as used in this disclosure, typically refers to fast and slow angle or fast or slow angle. Typically, such information is obtained using wireline systems, which requires tripping of a drill string, deployment of the wireline system, obtaining measurements, pulling the wireline tool, and then redeploying the drilling system. Alternatively, such measurements may require waiting until drilling is complete to perform wireline measurements for subsequent borehole completion purposes.

Identifying anisotropic (HTI/VTI/TTI) intervals in downhole or subsurface formations and principal shear slownesses (fast and slow) can aid in seismic processing. Further, such information may be used to determine formation dip angle, fracture strike, maximum and/or minimum principal stress direction(s), and other factors that may be important for well completion, as will be appreciated by those of skill in the art. During drilling operations, it has proven difficult to measure or determine such properties in slow formations. A slow formation is a formation in which a velocity of a compressional wave traveling through a borehole fluid is greater than a velocity of a shear wave through a surrounding formation. That is, the waves travel faster within the borehole (and/or the drilling fluid) than within the formation itself. Using dipole while-drilling systems is insufficient because such systems cannot measure low frequency formation flexural modes in slow formations, and thus cannot measure true slow shear slowness under all circumstances. Modeling may be used with dipole measurements to make estimates, but such estimates may not be sufficiently accurate or representative of the actual shear slowness of the formation.

Embodiments of the present disclosure are directed to obtaining fast and slow shear slowness for slow formations during drilling operations, and thus eliminate the need for wireline operations to be employed. This may be enabled, in accordance with some embodiments described herein, through the use of multipole measurements using an acoustic logging tool. For example, Alford rotation may be generalized to 4-component (4-C) cross-multipole measurements to obtain fast and slow shear slowness and associated polarization direction(s).

Figure 2:
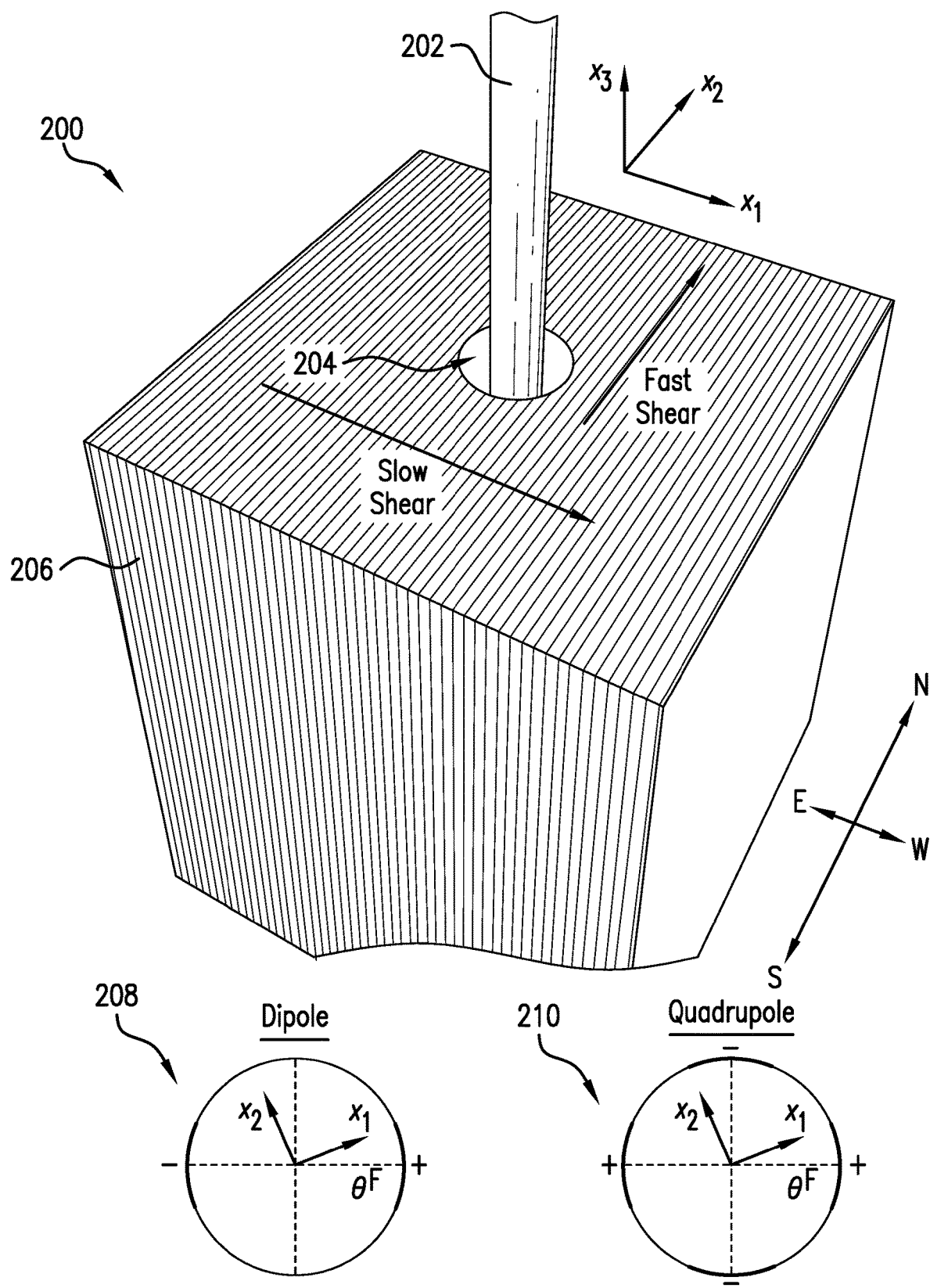
FIG. 2 is a schematic representation of a downhole tool in accordance with an embodiment of the present disclosure deployed in a borehole formed in a subsurface formation.

Referring now to FIG. 2, a schematic illustration of a downhole system 200 is shown. FIG. 2 is a schematic representation of a drilling tool 202 passing through a borehole 204 that is formed within a formation 206. The borehole 204 may be formed using the drilling tool 202, which may be arranged similar to that shown and described above, although various other types of downhole drilling systems may be implemented without departing from the scope of the present disclosure. As illustrated, the formation 206 may be formed of fractures dipping parallel to the borehole and which render the formation effectively behaving as a Horizontally Transversely Isotropic (HTI) medium. In this illustrative schematic, the formation 206, as shown, is an HTI formation, and thus is a medium having one isotropic plane. As such, the formation has a single plane (the fracture plane in FIG. 2) in which the elastic velocities are not changing. As illustrated and labeled, fast shear waves are polarized in the fracture strike direction (north-south in this example) and the slow shear waves perpendicular to that (east-west in this example). Both shear waves propagate along the borehole.

In FIG. 2, a first plane $(x_2, x_3)$ is an isotropic plane, $x_1$ is the slow shear wave polarization direction, $x_2$ is the fast shear wave polarization direction, and $x_3$ is the borehole axis direction and a fast and slow shear wave propagation direction. The direction perpendicular to the first (isotropic) plane $(x_2, x_3)$ may be referred to as a symmetry axis (e.g., direction of $x_1$). The medium displayed may be referred to as horizontal transversely isotropic (HTI) because the symmetry axis lies in the "horizontal" plane (i.e., $(x_1, x_2)$). A fractured medium (e.g., fractures dipping parallel to the borehole axis $x_3$) effectively functions as an HTI medium.

The lower portion of FIG. 2 illustrates two multipole excitation configurations of the drilling tool 202. As shown, both a dipole 208 and a quadrupole 210 excitation are shown. The polarizations of the multipole excitation constituting sources (acoustic sources) is indicated. Such tool configurations may be used to determine fast and slow formation slownesses in accordance with embodiments of the present disclosure.

Acoustic anisotropy is mainly caused by geological features such as bedding planes (intrinsic anisotropy), faults, and fractures. Acoustic anisotropy includes elastic acoustic anisotropy. Another type of anisotropy is a so-called stress-induced anisotropy due to the presence of borehole 204 formed within the formation 206. Embodiments of the present disclosure are directed to using a logging-while-drilling (LWD) quadrupole measurement system and associated processing methods to determine the orientation angle and magnitude of acoustic azimuthal anisotropy, represented by the fast and slow formation shear slowness. That is, embodiments of the present disclosure are directed to determining, for example, the fast and slow formation shear slowness and associated direction(s) and the fast and slow angle. The acoustic anisotropy analysis may be used in several applications such as, and without limitation, fracture characterization, wellbore stability, geosteering, completion planning, and rock mechanical property studies. For example, embodiments of the present disclosure may be used to determine the orientation of an HTI (crystallographic) formation reference frame (e.g., coordinate system of the formation) relative to a tool reference frame (e.g., coordinate system of the drill string or the BHA).

The concept of shear wave splitting (or shear wave birefringence) and its application in the oil and gas industry is multi-faceted and varies from large scale surface seismic applications and Vertical Seismic Profiling (VSP) applications to much smaller scale borehole acoustic applications (e.g., wireline or LWD). Such applications may include, for example and without limitation, fracture identification, identification of anisotropic depth intervals in the formation to aid in seismic migration, determination of principal stress directions, etc. In a borehole acoustic wireline application, the formation is assumed to be Transversely Isotropic (TI) in its elastodynamic behavior, meaning that the formation has three, mutually perpendicular directions. This is illustratively shown in FIG. 2, having direction $x_1$, direction $x_2$, and direction $x_3$. Two of these directions are invariant in terms of their elastodynamic properties (e.g., direction $x_2$ and direction $x_3$). The direction $x_3$ is a direction that is parallel to a longitudinal axis of the downhole tool.

There are three orthogonal planes: $(x_1, x_2)$, $(x_2, x_3)$, $(x_1, x_3)$. These three orthogonal planes may be referred to as symmetry planes with the $(x_2, x_3)$ plane often being referred to as the isotropic plane. Within the isotropic plane $(x_2, x_3)$ the elastodynamic properties are directionally invariant. That is, the elastodynamic properties (and therefore the elastic velocities) do not change within the isotropic plane $(x_2, x_3)$. The direction perpendicular to the isotropic plane (i.e., the $x_1$-direction in FIG. 2) has elastodynamic properties different from those that apply to the isotropic plane and such direction ($x_1$-direction) is often referred to as the symmetry axis.

Whether a formation can be regarded as transversely isotropic in its elastodynamic behavior often times depends on characteristic dimensions present in the formation microstructure relative to a wavelength of a wave (e.g., acoustic wave) that interacts with the formation. In this context it is well known that fractured formations and/or shales are transversely isotropic in their elastodynamic behavior.

The acronym 'VTI' stands for Vertical Transversely Isotropic, where the word 'Vertical' indicates the direction of the symmetry axis. This nomenclature is due to a typical surface seismic setting, where the bedding planes are (locally) parallel to the earth surface and therefore are denoted as "horizontal". In the case of shales, the (horizontal) bedding plane is the isotropic plane, henceforth the 'vertical' direction must be parallel to the transversely isotropic symmetry axis. In this same context, 'HTI' refers to a 'horizontal' symmetry axis. In FIG. 2, the isotropic plane is the fracture plane (first plane $(x_2, x_3)$) and the symmetry axis is oriented perpendicular to the fracture plane and also perpendicular to the borehole axis (direction $x_1$). In a more general case, where the borehole axis is not perpendicular nor parallel to the transversely isotropic symmetry axis is often referred to as Tilted Transversely Isotropic ("TTI").

With continued reference to FIG. 2, when a plane shear wave, propagating in the $x_3$-direction and polarized in an arbitrary direction (perpendicular to its propagation direction), enters the HTI formation, the plane shear wave will split into two separate shear waves: one polarized in the $x_1$-direction and one polarized in the $x_2$-direction. The one with the lowest slowness (reciprocal of velocity), is referred to as the fast shear wave and the other one is referred to as the slow shear wave. Moreover, if the initial shear wave polarization direction is parallel to either one of the principal directions ($x_1$-direction or $x_2$-direction), no birefringence occurs. In this case, the slowness will change to that of the pertaining (principal) polarization direction. The fast and slow principal directions are associated with the fast and slow angle.

Figure 3A:
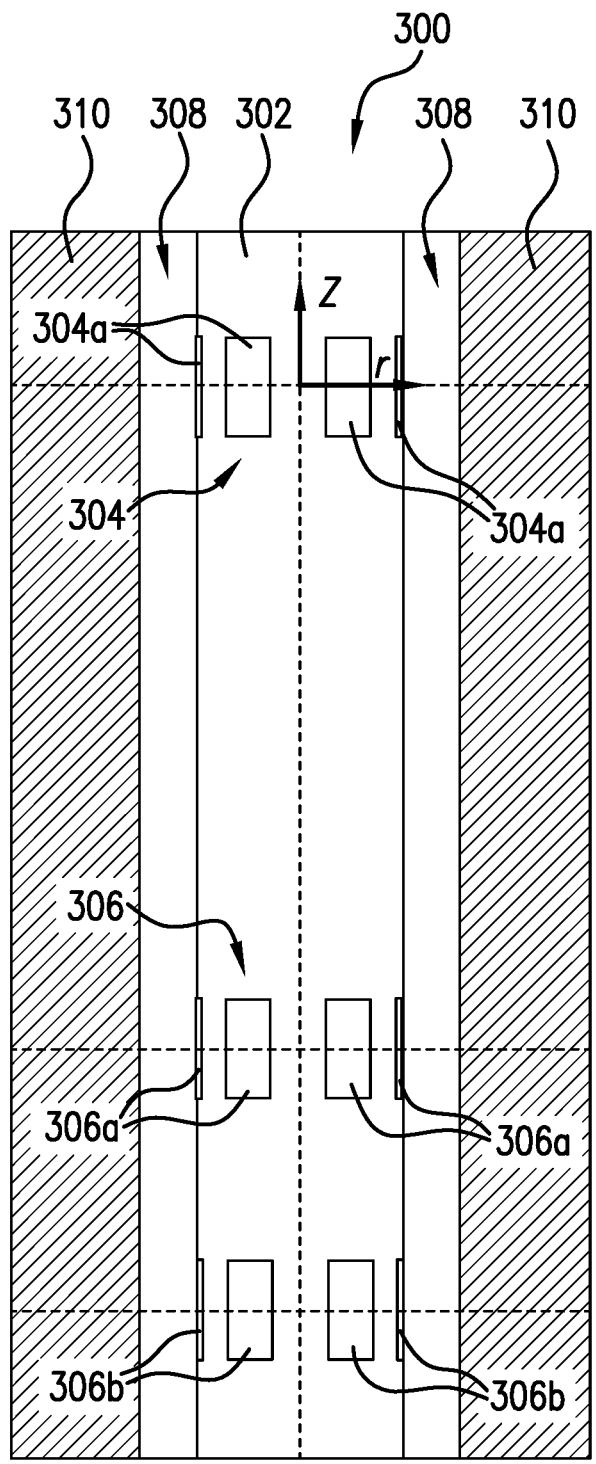
FIG. 3A is a schematic illustration of a downhole tool in accordance with an embodiment of the present disclosure.
Figure 3B:
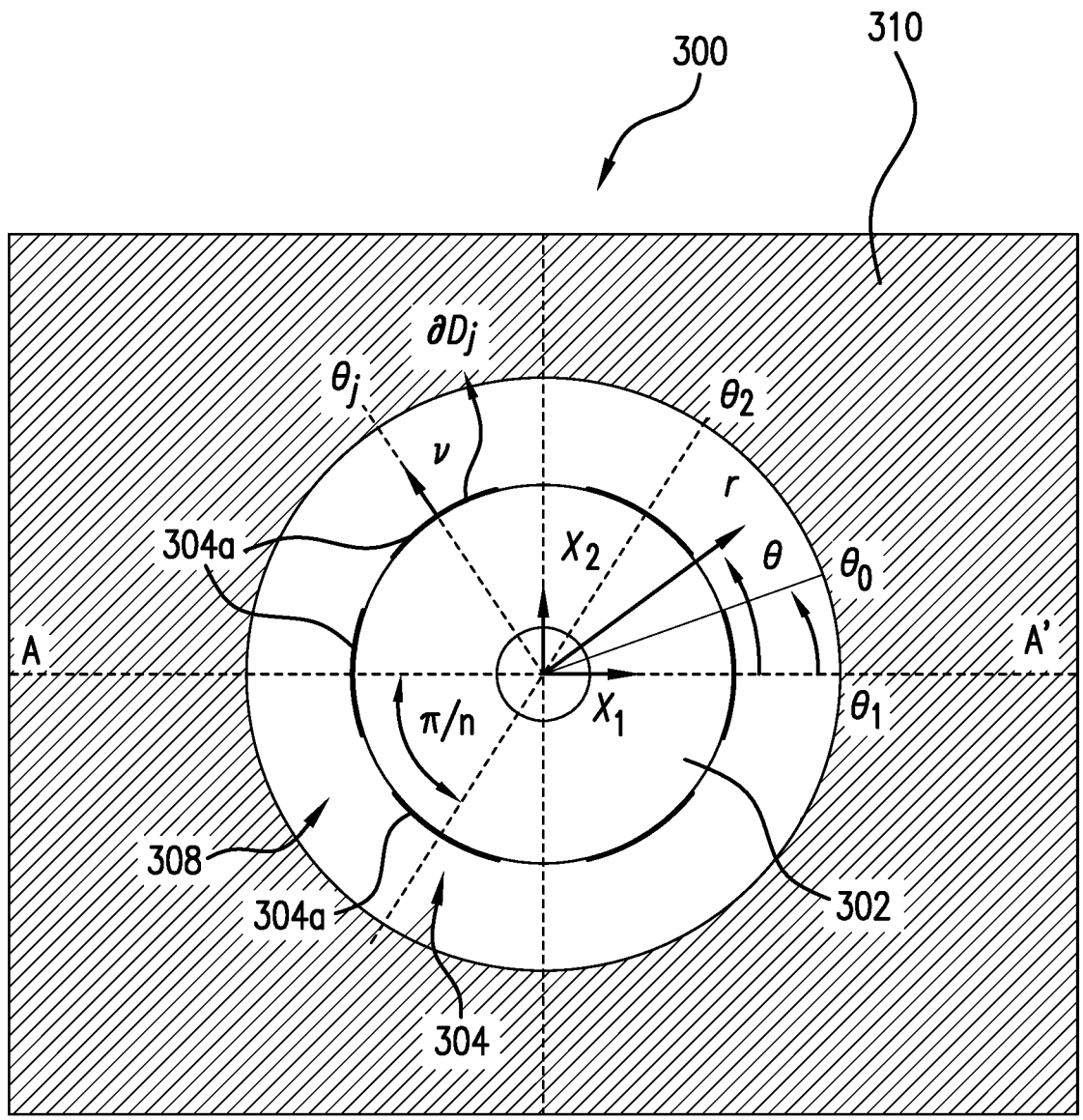
FIG. 3B is a planar cross-sectional depiction of a portion of the downhole tool of FIG. 3A.
Figure 3C:
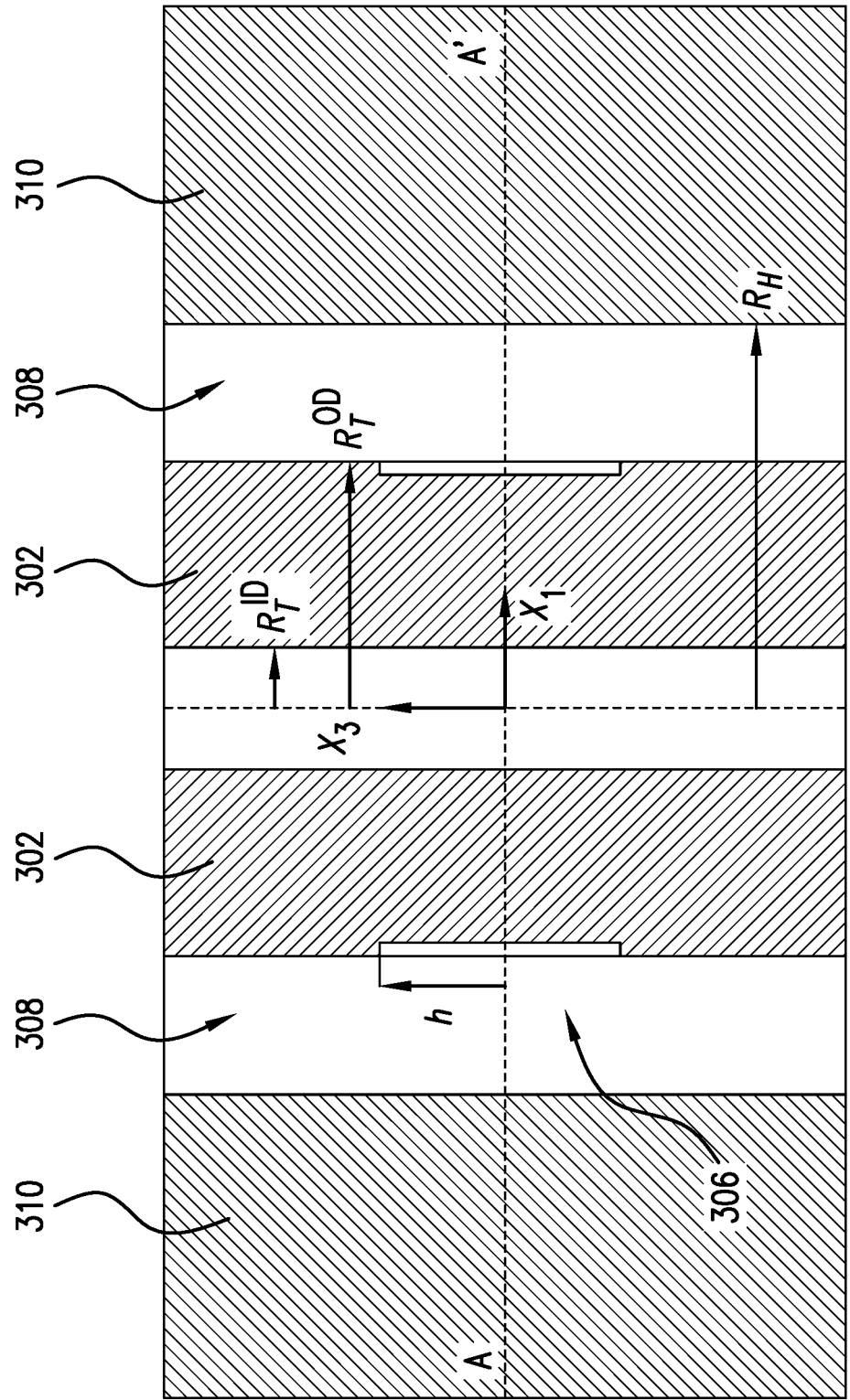
FIG. 3C is an elevation cross-sectional depiction of a portion of the downhole tool of FIG. 3A.

Turning now to FIGS. 3A-3C, a multipole borehole acoustic logging tool configuration 300 that may be employed in accordance with embodiments of the present disclosure is shown. In FIGS. 3A-3C, the configuration 300 consists of a downhole tool 302 (e.g., a bottomhole assembly configured to drill through a formation) having a multipole transmitter 304 of order n in combination with an axial array of multipole receivers 306, each of order n. The multipole receivers 306 are arranged axial separate from the multiple transmitter 304 along an axis of the downhole tool 302 (e.g., along z-direction or the longitudinal axis of the downhole tool). The downhole tool 302 may be part of a drill string, bottomhole assembly, wireline tool, or the like. The downhole tool 302 is positioned within a borehole 308 that has been drilled through a formation 310. The borehole 308, particularly in while-drilling applications, will be filled with fluids, such as drilling mud or the like.

In this example configuration 300, the multipole transmitter 304 of order n consists of 2n acoustic sources 304a located on the tool exterior or rim and are circumferentially (azimuthally) offset from one another by $$\frac{\pi}{n}$$

radians. The acoustic sources are also referred to, herein, as surface sources. The circumferential offset of the acoustic sources may be specified using a directional orientation in the reference frame of the formation. A circumferential position on or at the tool may be expressed using the azimuthal angle $\theta$ in the formation reference frame. The azimuthal angle in the formation reference frame identifies a direction in a plane perpendicular to the earth surface. The azimuthal angle identifies a geographic direction. The acoustic sources may be located on or at the outer surface of the tool. In some embodiments, alternatively or in combination, the acoustic sources may be located inside the tool or may be located projecting from the outer surface of the tool. The term circumferentially offset does not limit to a location at the outer surface of the tool but rather refers to a direction defined by a circumferential position along the circumference of the tool. A circumferential offset acoustic source can have any radial position in, on, or at the tool. In accordance with some embodiments of the present disclosure, the tool may comprise two multipole transmitters circumferentially offset from each other.

As shown in FIG. 3B, the surface sources 304a are arranged at azimuthal angles of $\theta_1$, $\theta_2$, $\theta_3$. The multipole receiver 306 of order n consists of two sets of 2n acoustic receivers 306a, 306b located in the tool or on the tool exterior or rim and are circumferentially (azimuthally) offset from one another by $$\frac{\pi}{n}$$

radians and may be arranged at the same azimuthal angles $\theta_1$, $\theta_2$, $\theta_3$ as the surface sources 304a. The acoustic receivers are also referred to as surface receivers. The first and second sets of multiple surface receivers 306a, 306b are arranged axially offset from each other, in addition to being axially offset from the multipole transmitter 304. The surface sources 304a can be excited, either by firing all with equal polarity ($\sigma=1$) or by firing adjacent surface sources 304a by alternate polarity ($\sigma=-1$). There are three excitation types that have practical relevance to the present disclosure. Specifically, the three types of excitation are monopole, dipole, and quadrupole. The azimuth angles given in this disclosure are reference to an azimuthal reference angle $\theta_0$. The acoustic sources 304a in the multipole transmitter 304 may be one or more of acoustic piston sources, acoustic ring sources, and/or acoustic piezoelectric sources. The acoustic receivers 306a in the multipole receiver 306 may be hydrophone(s), including, but not limited to, piezoelectric materials. The axial offset of the acoustic receiver 306 that is closest to the multipole transmitter 304 may be between 1 m and 5 m, or between 1 m and 4 m, or between 2 m and 3 m. It is to be noted that a multipole transmitter may be located in the BHA uphole from or relative to the multipole receivers or may be located downhole from or relative to the multipole receivers. An uphole location refers to a location in the BHA closer to the earth surface and a downhole location refers to a location in the BHA closer to the drill bit.

Monopole excitation has the following properties: ($\sigma=1$, $n=2$ or $n=\rightarrow\infty$). A borehole guided wave type contained in the monopole cylindrical wavefield (e.g., acoustic pressure) that is relevant for this disclosure is the Stoneley wave. The Stoneley wave is often associated with the 'breathing' of a fluid-filled borehole (e.g., borehole 308 in FIGS. 3A-3C). The monopole wavefield is omni-directional and is thus independent of azimuthal angle ($\theta$). This also holds true for HTI formations.

Dipole excitation has the following properties: ($\sigma=-1$, $n=1$). The borehole guided wave types contained in the dipole cylindrical wavefield (e.g., acoustic pressure) that are relevant for this disclosure are formation and tool flexural waves. In a typical wireline configuration, only the formation flexural wave is of practical importance. In a while-drilling application or configuration, both the formation flexural waves and the tool flexural waves are of importance. In case any of the constituting surface sources 304a of the downhole tool 302 is azimuthally aligned to the fast or slow principal direction of the formation (e.g., direction $x_2$ or direction $x_1$, respectively, in FIG. 2), only the fast or slow principal formation and/or tool flexural waves will be excited, respectively. Assuming an HTI formation, in case none of the constituting surface sources 304a is azimuthally aligned to the fast or slow principal direction (e.g., direction $x_2$ or direction $x_1$, respectively, in FIG. 2), both the fast and slow principal formation and/or tool flexural waves will be excited, each having a different weight, depending on the orientation of the surface sources 304a relative to the fast principal direction. At low frequencies, such as close to a cut-off frequency, the fast and slow principal formation flexural wave propagates with the true fast and slow principal formation shear wave slowness, respectively.

Quadrupole excitation has the following properties: ($\sigma=-1$, $n=2$). The borehole guided wave type contained in the quadrupole cylindrical wavefield (e.g., acoustic pressure) that is relevant for this disclosure is the formation quadrupole wave. In case any of the constituting surface sources 304a is azimuthally aligned to the fast or slow principal direction (e.g., direction $x_2$ or direction $x_1$, respectively, in FIG. 2: or as shown in FIG. 3B illustrating the aligned orientation), only the fast or slow principal formation quadrupole wave will be excited, respectively. Assuming an HTI formation, in case none of the constituting sources 304a is azimuthally aligned to the fast or slow principal direction (e.g., direction $x_2$ or direction $x_1$, respectively, in FIG. 2), both the fast and slow principal formation quadrupole wave will be excited, each having a different weight, depending on the orientation of the surface sources 304a relative to the fast principal direction. At low frequencies, such as close to a cut-off frequency, the fast and slow principal formation quadrupole wave propagates approximately with the true fast and slow principal formation shear wave slowness, respectively. It will be appreciated that the teaching described herein may be applied to any multipole system of order n≥1, and that the specific configurations described herein are not to be limiting, but rather are for illustrative and explanatory purposes.

In an isotropic formation with alternate polarity ($\sigma=-1$), multipole excitations of order n in HTI formations will give rise to an excitation of cylindrical waves having azimuthal wavenumbers that are odd multiples of n (e.g., n, 3n, 5n, etc.). In HTI formations, additional anisotropy induced mode contaminants will be introduced. In cases where n is odd, these will be contaminant modes having odd azimuthal wavenumbers. In cases where n is even, these will be contaminant modes having even azimuthal wavenumbers. Although in practice this will have no impact on the dipole excitation (n=1), it does have an impact on the quadrupole excitation (n=2). A quadrupole excitation in an HTI formation will produce a cylindrical wave with azimuthal wavenumber "0", i.e., the monopole. This phenomenon may play a part in the teachings of the present disclosure and in certain embodiments of the present disclosure.

A method frequently used to determine the fast and slow principal (polarization) directions and their associated fast and slow formation shear slowness is based on the Alford rotation methodology. This method applies to plane waves and assumes a dipole or force source excitation but, on a rudimentary level, sheds little light on how this relates to the borehole guided cylindrical waves that propagate in a fluid-filled borehole (e.g., during while-drilling applications). As opposed to the earlier explained single component multipole measurement of order n (e.g., FIGS. 3A-3C), a four component multipole measurement of order n consists of two single multipole sources of order n combined with an axial-spaced array of two single multipole receivers of order n, per (axial) receiver level. The two multipole sources, as well as the two multipole receivers, are circumferentially (azimuthally) offset on the tool or angularly offset relative to a longitudinal tool axis from each other by an amount, $$\frac{\pi}{2n}.$$

Figure 4A:
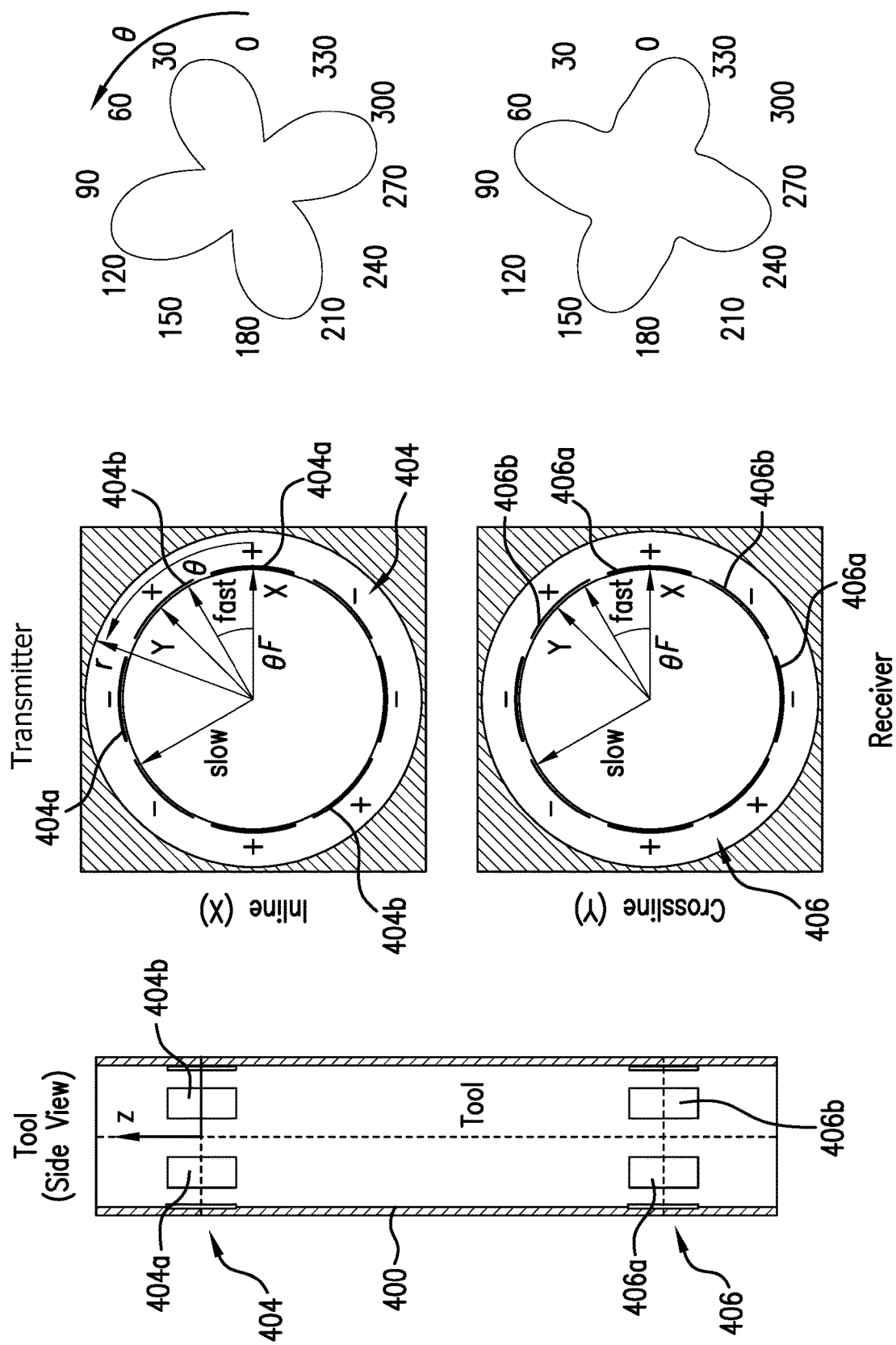
FIGS. 4A-4B are depictions of a downhole tool in accordance with an embodiment of the present disclosure and measurement data associated therewith, with a multipole source X-direction having an arbitrary angle with a fast principal direction.
Figure 4B:
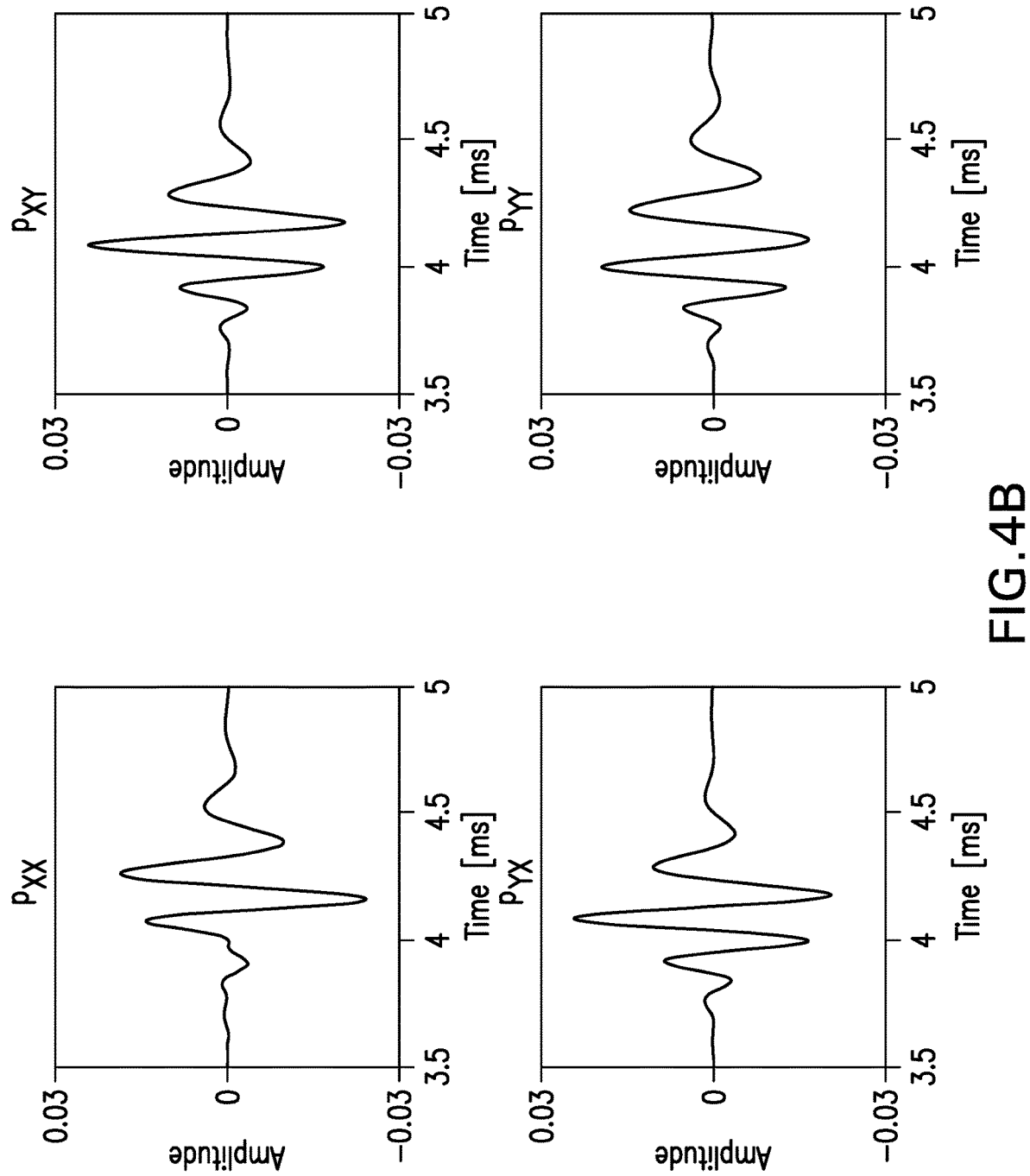

Constituting sources and receivers, as described herein, are always circumferentially (azimuthally) co-located on the tool (i.e., arranged at the same azimuthal angle θ of the formation relative to a tool axis or borehole axis). An example schematic configuration of a four component quadrupole measurement system ($\sigma=-1$, n=2) in accordance with an embodiment of the present disclosure is displayed in FIGS. 4A-4B. In FIG. 4A, a tool 400 is shown having an acoustic multipole transmitter 404 and an acoustic multipole receiver 406. The acoustic multipole transmitter 404 is configured to generate or transmit acoustic waves and includes multiple quadrupole transmitters 404a, 404b. The acoustic multipole receiver 406 is configured to detect acoustic waves and includes multiple quadrupole receivers 406a, 406b. It is noted that in the plan view of FIG. 4A, two quadrupole transmitters 404a, 404b are co-located at the same axial (z) position along the tool 400. Similarly, two quadrupole receivers 406a, 406b are co-located at the same axial (z) position along the tool 400. Although this is one example embodiment, it is also possible, in accordance with other embodiments, for both quadrupole sources 404a, 404b and/or both quadrupole receivers 406a, 406b to be axially offset from each other. In some such configuration, it may be preferred to have such axial offset to be less than a quarter wavelength of the formation quadrupole wave. In some non-limiting examples, the axial offset may be less than 1 meter of axial distance.

In one non-limiting embodiment, two multipole transmitters and two multipole receivers with n≥3 may be used. In another embodiment, multiple multipole transmitters and multiple multipole receivers may be deployed. The multiple multipole receivers may include 2 to 6, or 6 to 8, or 8 to 12, or 12 to 16, or more multipole receivers. The multipole receivers may be axially offset from each other by less than 0.25 m, less than 0.5 m, or less than 1 m, or less than 2 m, or less than 5 m. The axial offset between two neighboring multipole receivers may not be the same for all neighboring multipole receivers within a receiver array. The axial spacing between the multiple multipole transmitter and the multipole receiver of the multiple multipole receivers located closest to the multiple multipole transmitters may be greater than 1 m, or greater than 2 m, or greater than 5 m, or greater than 10 m.

What follows is a concise summary of a generalized Alford rotation as it applies to the four component multipole system illustrated in FIG. 4A, with a measurement of order n (n∈N\{0}, $\sigma=-1$).

With reference to FIG. 4A, the X multipole transmitter/receiver (404a, 406a) and the Y multipole transmitter/receiver (404b, 406b) are distinct from each other and arranged circumferentially (azimuthally) from each other on or at the tool 400 to align with the respective directions (e.g., offset by an azimuthal offset angle). The circumferential arrangement is referenced to the formation azimuthal angle θ=0, as defined in FIG. 3B.

In FIG. 4A, the circumferential locations on or at the tool (corresponding to azimuthal locations of the formation) of the constituting sources of the multipole transmitter 404a and constituting receivers of the multipole receiver 406a of the X-multipole transmitter/receiver are given by:

$$\theta_j^X = (j-1)\frac{\pi}{n}, j = 1, 2, \ldots, 2n \tag{1}$$

Similarly, the circumferential locations (corresponding to azimuthal locations of the formation) of the constituting sources of the multipole transmitter 404b and constituting receivers of the multipole receiver 406b of the Y-multipole transmitter/receiver are given by:

$$\theta_j^Y = \pm\frac{\pi}{2n} \pm (j-1)\frac{\pi}{n}, j = 1, 2, \ldots, 2n \tag{2}$$

Note that θ=0 always coincides with the X-direction in FIG. 4A. If the X-multipole transmitter 404a fires at azimuthal angle θ, the (complex) frequency domain acoustic pressure at location (r, θ, z) can be expressed, to the first order, as:

$$\hat{p}_x(r,\theta,z,s)=2A[\cos(n\theta^F)\hat{C'}_n{}^F(r,z,s)\cos(n(\theta-\theta^F))-\sin(n\theta^F)\hat{C'}_n{}^S(r,z,s)\sin(n(\theta-\theta^F))] \quad (3)$$

Figure 4C:
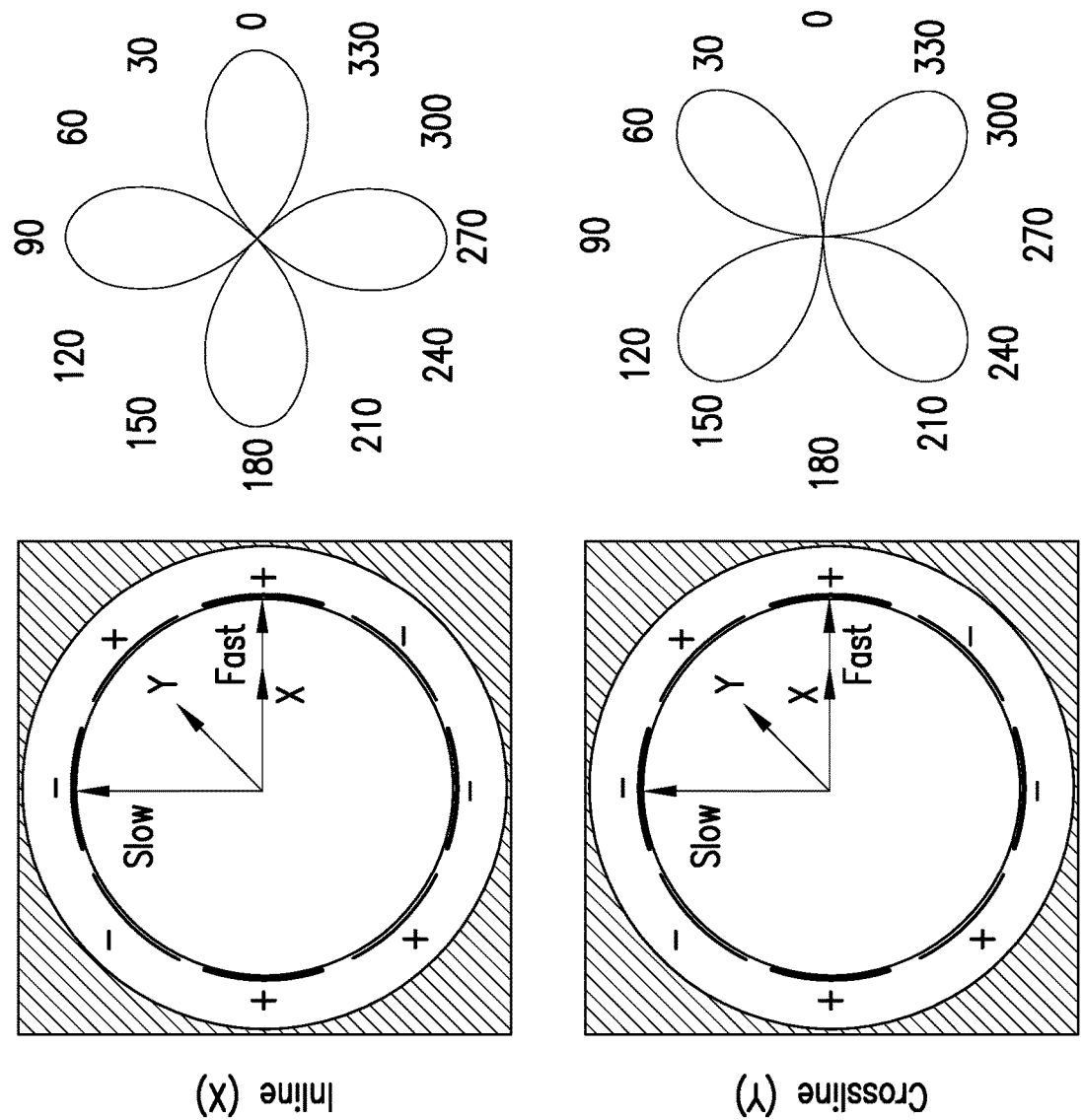
FIGS. 4C-4D are depictions of a downhole tool in accordance with an embodiment of the present disclosure and measurement data associated therewith, with a multipole source X-direction aligned with the fast principal direction.
Figure 4D:
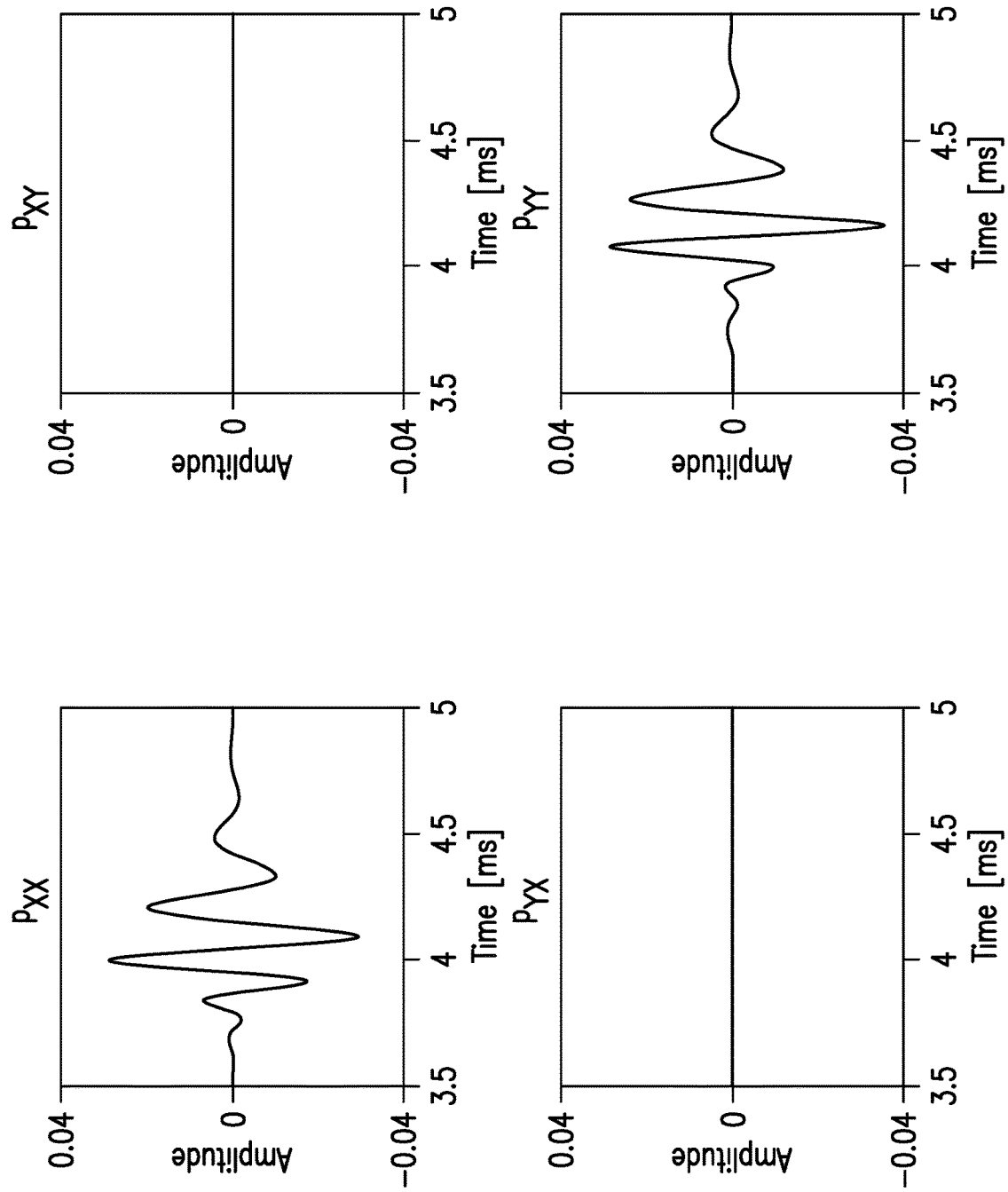

In Equation (3), s is the complex frequency, A is a constant and $\hat{C'}_n{}^F$ and $\hat{C'}_n{}^S$ are the (complex) frequency domain omnidirectional fast and slow principal cylindrical waves of order n at location (r, z), where location r denotes the radial position in the borehole or borehole fluid and location z denotes the axial position in the borehole or borehole fluid (e.g., as shown in FIG. 3A). These are the waves that would be measured in isolation if θ=θ$^F$ and $$\theta = \theta^F + \frac{\pi}{2n},$$

respectively, and where θ$^F$ denotes the azimuth angle pertaining to the fast principal (polarization) direction. This situation $$\left(\theta = \theta^F \text{ and } \theta = \theta^F + \frac{\pi}{2n}\right)$$

is shown in FIGS. 4C-4D. Due to the alignment of the fast principal direction and the firing azimuthal angle of the multipole transmitter 404a, the $P_{XY}$ and $P_{YX}$ components are zero, as indicated in FIG. 4D. The term principal wave in this disclosure refers to fast and slow principal wave or fast or slow principal wave.

Similarly, if the Y-multipole transmitter 404b fires, the (complex) frequency domain acoustic pressure at location (r, θ, z), can be expressed, to the first order, as:

$$\hat{p}_Y(r,\theta,z,s)=2A[\cos(n\theta^F)\hat{C'}_n{}^S(r,z,s)\sin(n(\theta-\theta^F))+\sin(n\theta^F)\hat{C'}_n{}^F(r,z,s)\cos(n(\theta-\theta^F))] \quad (4)$$

The stacked (e.g., stacking with alternate polarity, i.e., the same polarity as the multipole transmitter firing polarity of its sources) XX-acoustic pressure may be defined as:

$$\hat{p}_{XX}(r,z,s) = \sum_{j=1}^{2n}(-1)^{j+1}\hat{p}_X(r,\theta_j^X,z,s) \quad (5)$$

The stacked XY acoustic pressure may be defined as:

$$\hat{p}_{XY}(r,z,s) = \sum_{j=1}^{2n}(-1)^{j+1}\hat{p}_X(r,\theta_j^Y,z,s) \quad (6)$$

The stacked YX acoustic pressure may be defined as:

$$\hat{p}_{YX}(r,z,s) = \sum_{j=1}^{2n}(-1)^{j+1}\hat{p}_Y(r,\theta_j^X,z,s) \quad (7)$$

The stacked YY acoustic pressure may be defined as:

$$\hat{p}_{YY}(r,z,s) = \sum_{j=1}^{2n}(-1)^{j+1}\hat{p}_Y(r,\theta_j^Y,z,s) \quad (8)$$

Stacking, as used herein, refers to adding up acoustic pressure signals using a defined polarity such as an alternate polarity. Stacking may be performed to increase a signal-to-noise ratio. Based on Equations (4)-(8), the expression for a four component acoustic pressure data matrix is:

$$\hat{P}(r,z,s)=R(n\theta^F)\hat{G}_n(r,z,s)R^T(n\theta^F) \quad (9)$$

In Equation (9), R is a rotation matrix and G is a principal wave matrix and has the principal waves in the diagonal elements, and:

$$\hat{P}(r, z, s) = \begin{pmatrix} \hat{p}_{XX} & \hat{p}_{XY} \\ \hat{p}_{YX} & \hat{p}_{YY} \end{pmatrix}(r, z, s) \quad (10)$$

$$R(n\theta^F) = \begin{pmatrix} \cos(n\theta^F) & -\sin(n\theta^F) \\ \sin(n\theta^F) & \cos(n\theta^F) \end{pmatrix} \quad (11)$$

$$\hat{G}_n(r, z, s) = \begin{pmatrix} \hat{C}_n'^F & 0 \\ 0 & \hat{C}_n'^S \end{pmatrix}(r, z, s) \quad (12)$$

In Equation (12), the fast and slow principal cylindrical waves, $\hat{C'}_n{}^F$ and $\hat{C'}_n{}^S$, can be obtained from Equation (9), as:

$$\hat{G}_n(r,z,s)=R^T(n\theta^F)\hat{P}(r,z,s)R(n\theta^F) \quad (13)$$

With respect to Equations (9) and (13), it is noted that the special case, n=1 (dipole), is well known and heavily used in wireline cross-dipole applications. However, the equations are equally valid for higher order multiple systems, such as n=2 (quadrupole), n=3 (hexapole), etc. The borehole guided modes contained in fast and slow formation dipole, quadrupole, and hexapole modes may be designated as: $\{\hat{C'}_1{}^F, \hat{C'}_1{}^S\}$, $\{\hat{C'}_2{}^F, \hat{C'}_2{}^S\}$, $\{\hat{C'}_3{}^F, \hat{C'}_3{}^S\}$. All modes have similar phase slowness dispersion curves in that all of them approximately approach the fast and slow formation shear wave slowness, at their respective cut-off frequencies.

Figure 5A:
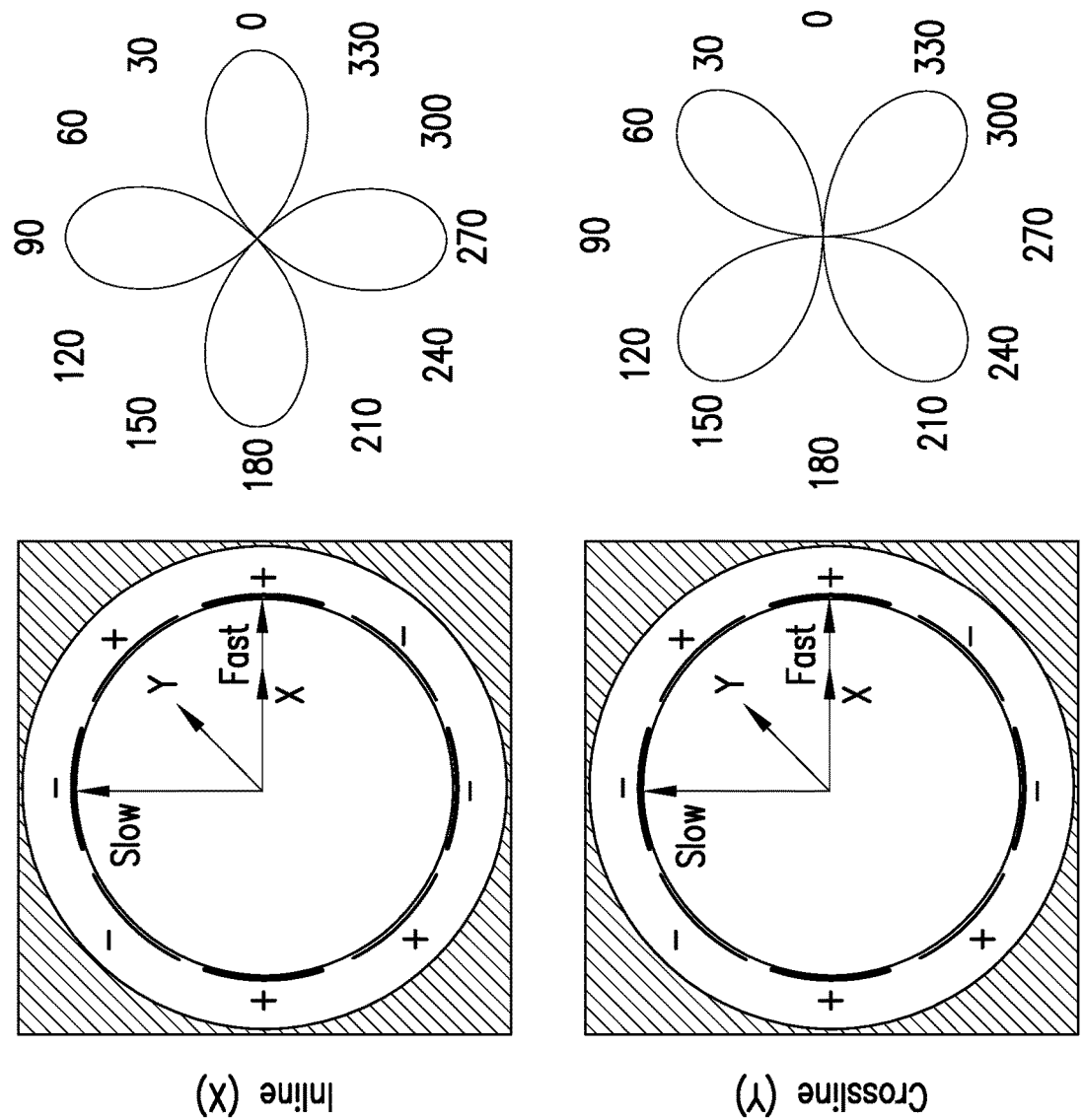
FIG. 5A is a schematic illustration of a downhole tool in accordance with an embodiment of the present disclosure.
Figure 5B:
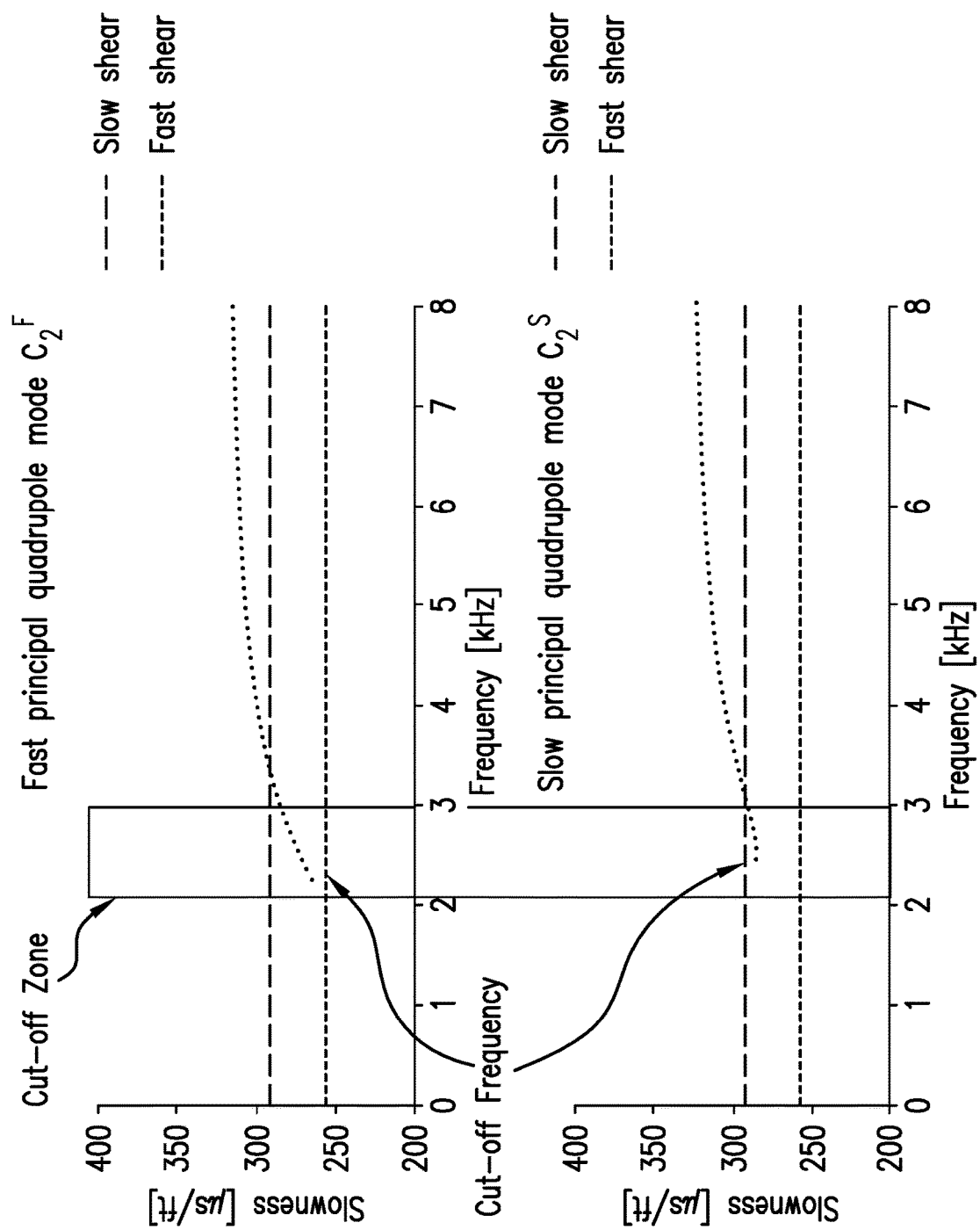
FIG. 5B includes schematic plots of cut-off zones associated with the downhole tool of FIG. 5A.

In accordance with embodiments of the present disclosure, and particularly the four component quadrupole configuration, an example of the fast and slow principal quadrupole wave dispersion curves is illustrated in FIGS. 5A-5B. It is noted that these principal cylindrical waves, often referred to as principal excitation functions, contain more than just the guided modes referred to. These principal excitation functions may also contain refracted P- and S-waves depending on the earth formation type (e.g., geology, lithology, and/or earth model). Moreover, it is noted that Equation (13) applies to borehole cylindrical waves and not just to plane waves.

The four component multipole data matrix, $\hat{P}$ in Equation (13), can be used to obtain the fast and slow principal angles (e.g., the shear polarization direction(s)) and the associated fast and slow principal shear wave slowness pertaining to the fast and slow principal waves ($\hat{C'}_n{}^F$ and $\hat{C'}_n{}^S$, respectively). However, depending on the specifics of the measurement configuration (e.g., wireline or LWD), different implementation strategies may be required. For example, the following aspects may be considered.

Firstly, by definition, the X-multipole and Y-multipole sources cannot be fired simultaneously. As such, the entire data matrix ($\hat{P}$) can never be obtained at a single location on a tool (e.g., (θ, z)). That is, when the X-source fires, only the XX and XY components may be obtained. Similarly, when the Y-source is fired, only the YX and YY components may be obtained. This is particularly true during while-drilling applications but may also apply to a wireline application that is being conveyed through a borehole. In such measurements, the XX and XY components will be recorded at, for example, $t=t_1$, while the YX and YY components will be recorded at, for example, $t=t_2$ where $(t_2 \neq t_1)$. During this time interval $(\Delta t = t_2 - t_1)$, the tool will have moved over an axial distance $\Delta z$ and rotated an (azimuthal) angle difference $\Delta \theta$ through the borehole.

Secondly, denoting the logging speed during wireline applications or the rate of penetration (ROP) during LWD applications by $V_L$ and noting that a typical time interval $\Delta t$ is so small that: $V_L \Delta t \ll (N_{rec}-1) rrsp$, where $N_{rec}$ denotes the total number of multipole receivers and rrsp denotes the inter (multipole) receiver spacing. It is typically assumed that the formation wave speeds do not change over a depth increment $\Delta z (=V_L \Delta t)$. It is noted that the largest value for $V_L$ occurs during wireline applications/operations. In such wireline applications, a typical value is $$V_L = 30 \frac{\text{ft}}{\text{min}}.$$

In one non-limiting example, where $N_{rec}=12$ and rrsp=0.5 ft, one finds: $\Delta t \ll 11s$. The increment between two multipole transmitter firings is represented by $\Delta t$ and may be of order $10^{-1}s$ (e.g., 125 ms). As a result of the very small time increment $\Delta t$, the only factor to consider is the azimuth increment, $\Delta \theta$ during rotation of the tool in the borehole.

A maximum angular speed about the longitudinal axis of a wireline acoustic tool is about $$1 \frac{\text{Rev}}{\text{min}}$$

and a typical angular speed or an LWD tool about the longitudinal axis of the LWD tool is about $$2-4 \frac{\text{Rev}}{\text{sec}}.$$

Therefore, when considering the aforementioned $\Delta t$ values, it is evident that Equation (13) can be used for multipole wireline configurations but cannot be used for LWD multipole configurations. In the case of LWD multipole applications, the tool rotation (represented by $\Delta \theta$) between two shots, or firings of the multipole sources, will be around $$\frac{3\pi}{4} Rad (135°).$$

As such, the X-multipole and Y-multipole source firings will typically occur at very different azimuthal angles $\theta$.

Thirdly, the recording time, $T_{rec}$, is a subset of the time interval, $\Delta t$, between two shots. Although typically it is much shorter than $\Delta t$ (e.g., 12 ms$\leq T_{rec} \leq$20 ms), it cannot be ignored. If the excitation time is denoted by $t_1$ and the LWD tool angular speed is denoted by $\omega_T(t)$, the angle increment $\theta(\tau)$ occurring during time interval $t_1 < t \leq t_1 + \tau$ follows as:

$$\theta(\tau) = \int_{t=t_1}^{t_1+\tau} \omega_T(t) dt,$$

where $0 < \tau \leq T_{rec}$ wherein $\tau$ is the progressing time. Because the pressure amplitude contribution of any cylindrical wave $(p_m(t))$ is proportional to $\cos(m\theta)$, (i.e., $p_m(t)=p(t)\cos(m\theta)$), it follows that, strictly speaking, the omnidirectional pressure, $p(t)$, may require a time-dependent amplitude correction, e.g., $p_m(t)=p(t)\cos(m\theta(t))$, where $t_1 < t \leq T_{rec}$ and where $\theta(t)$ is measured relative to the X-source orientation at excitation time ($t=t_1$). Typically, this reference is set to zero. In the above, m is the azimuthal wave number and m=0,1, 2,3, . . . .

In accordance with embodiments of the present disclosure, the formulation presented in Equations (9)-(13) may be extended to become a substitute for a three-component system. Such four-component system may not necessarily be orthogonal, and two missing components may be taken from different azimuthal tool positions. For example, the missing components may be obtained at: $\theta$ and $\theta + \Delta \theta$ ($\Delta \theta \neq k2\pi$, $k \in Z$). It is assumed that the concurrent axial movement of the tool is much smaller than an axial multipole array aperture. The axial multipole array aperture is the axial distance between the first and last multipole receiver in a multiple multipole receiver configuration. The first and last multipole receiver refers to the uppermost and the lowermost receiver, respectively, along the longitudinal axis of the downhole tool, wherein an uppermost location is closer to the earth surface than a lowermost location and the lowermost location is closer to the drill bit than the uppermost location. The pressure in the fluid-filled borehole due to the X-multipole source firing at azimuthal angle $\theta$ is denoted by $\hat{p}_X(r, \theta, z, s)$ and is given by Equation (3), above. The pressure in the fluid-filled borehole due to the X-multipole source firing at azimuthal angle $\theta + \Delta \theta$ is denoted by $\hat{p}_Y(r, \theta, z, s)[=\hat{p}_X(r, \theta+\Delta\theta, z, s)]$ and follows from Equation (3) as:

$$\hat{p}_Y(r,\theta,z,s)=2A[\cos(n[\theta^F-\Delta\theta])C'^F_n(r,z,s)\cos(n(\theta-\theta^F))-\sin(n[\theta^F-\Delta\theta])C'^S_n(r,z,s)\sin(n(\theta-\theta^F))] \quad (14)$$

Now, assuming the X-multipole source is firing, the azimuthal reception coordinates for the X-multipole receivers and the Y-multipole receivers does not change. That is, the azimuthal reception coordinates are still presented by Equations (1) and (2), respectively. However, when the Y-source is firing (i.e., the X-source is at azimuth $\theta+\Delta\theta$), the azimuthal receiver positions have changed by an amount $\Delta\theta$. As such, Equation (1) becomes:

$$\theta^X_j \to \theta^Y_j = \Delta\theta + (j-1)\frac{\pi}{n}, j=1,2,\ldots,2n \quad (15)$$

and Equation (2) becomes:

$$\theta^Y_j \to \theta^X_j = \Delta\theta \pm \frac{\pi}{2n} \pm (j-1)\frac{\pi}{n}, j=1,2,\ldots,2n \quad (16)$$

It is evident that for the Y-multipole transmitter firing, the in-line reception coordinates are presented by Equation (15) and the cross-line reception coordinates are presented by Equation (16). Alternate polarity stacking over the former yields the new YY-component. Alternate polarity stacking over the latter yields the new YX-component. The resulting equations for $\hat{p}_{XX}(r, z, s)$ and $\hat{p}_{XY}(r,z,s)$ remain unaltered and follow from Equation (9). For $\hat{p}_{YY}(r, z, s)$ and $\hat{p}_{YX}(r, z, s)$, the following follows:

$$\hat{p}_{YY}(r,z,s)=2nA[\hat{C}'^F_n(r,z,s)\cos^2(n[\theta^F-\Delta\theta])+\hat{C}'^S_n(r,z,s)\sin^2(n[\theta^F-\Delta\theta])] \quad (17)$$

and $$\hat{p}_{YX}(r,z,s)=2nA[\hat{C}'^S_n(r,z,s)-\hat{C}'^F_n(r,z,s)]\sin(n[\theta^F-\Delta\theta])\cos(n[\theta^F-\Delta\theta]) \quad (18)$$

In analogy to Equation (9):

$$\hat{P}'(r,z,s) = Q(n\Delta\theta)R(n\theta^F)\hat{G}_n(r,z,s)R^T(n\theta^F) \quad (19)$$

where $$\hat{P}'(r,z,s) = \begin{pmatrix} \hat{p}_{XX} & \hat{p}_{XY} \\ \hat{p}'_{YX} & \hat{p}'_{YY} \end{pmatrix}(r,z,s) \quad (20)$$

and $$[\hat{p}'_{YX}\ \hat{p}'_{YY}] = [\hat{p}_{YX}\ \hat{p}_{YY}]R^T\left(n\Delta\theta - \frac{\pi}{2}\right) \quad (21)$$

and $$Q(n\Delta\theta) = \begin{pmatrix} 1 & 0 \\ \cos(n\Delta\theta) & \sin(n\Delta\theta) \end{pmatrix} \quad (22)$$

In Equation (22), Q is an offset matrix. Further, inversely to Equation (19):

$$\hat{G}_n(r,z,s) = R^T(n\theta^F)Q^{-1}(n\Delta\theta)\hat{P}'(r,z,s)R(n\theta^F) \quad (23)$$

where $$Q^{-1}(n\Delta\theta) = \begin{pmatrix} 1 & 0 \\ -\cot(n\Delta\theta) & 1/\sin(n\Delta\theta) \end{pmatrix} \quad (24)$$

It is noted that in the case of orthogonal multipole source firings, $$\Delta\theta = \frac{\pi}{2n}$$

and consequently $Q^{-1}=I$ (the identity matrix). It now follows, via Equation (21) that $\hat{P}'=\hat{P}$ and consequently that Equation (19) changes to Equation (9) and Equation (23) changes to Equation (13).

Depending on the sophistication of the acquisition system, in particular its ability to fire at particular azimuthal angles accurately, there are several possibilities in determining the fast angle. In accordance with some example embodiments of the present disclosure, two methods are presented that rely on the minimization of the so called 'cross-line energy'. This refers to the fact that, ideally, the diagonalization occurring in Equation (13) or Equation (23) should result in the vanishing of the off-diagonal elements contained in $\hat{G}_n$. Now, expanding the off-diagonal elements in Equation (23), the following may be obtained:

$$0 = [\hat{p}_{XY} + \hat{p}_{YX} + \cot(n\Delta\theta)(\hat{p}_{YY} - \hat{p}_{XX})]\cos(2n\theta^F) + [\hat{p}_{YY} - \hat{p}_{XX} - \cot(n\Delta\theta)(\hat{p}_{XY} + \hat{p}_{YX})]\sin(2n\theta^F) \quad (25)$$

In certain configurations where the source firings may be achieved at orthogonal positions, the earlier mentioned relevant condition of $$\Delta\theta = \frac{\pi}{2n}$$

may be invoked, resulting in simplifying Equation (25) to:

$$\tan(2n\theta^F) = \left[\frac{\hat{p}_{XY} + \hat{p}_{YX}}{\hat{p}_{XX} - \hat{p}_{YY}}\right] \quad (26)$$

In such configurations, it is desirable to seek solutions in the range $0 \leq \theta^F < \pi$. Because of the periodicity of tan(x) (i.e., tan(x+k$\pi$)=tan(x), k$\in$Z), it follows that:

$$\theta^F = \theta^F + k\frac{\pi}{2n}, (k = 0, 1, \ldots, 2n-1; n \geq 1) \quad (27)$$

where $$\theta^F = \frac{1}{2n}\arctan\left[\frac{\hat{p}_{XY} + \hat{p}_{YX}}{\hat{p}_{XX} - \hat{p}_{YY}}\right] \quad (28)$$

Now, in the dipole case (n=1) there are two values for $\theta^F$ in the interval defined by $0 \leq \theta^F < \pi$: $\theta^F$ and $$\theta^F + \frac{\pi}{2}.$$

One of the two values of $\theta^F$ corresponds to the polarization of the fast principal dipole mode ($\hat{C}'_1{}^f$). The other of the two values of $\theta^F$ corresponds with the polarization of the slow principal dipole mode ($\hat{C}'_1{}^S$). This is often referred to as the 'angle ambiguity'. Conventionally, to find out which is the polarization of the fast principal dipole mode ($\hat{C}'_1{}^F$) and which is the polarization of the slow principal dipole mode ($\hat{C}'_1{}^S$), one would substitute the outcome of Equation (28) ($0 \leq \theta^F < \pi$) in Equation (13). One would then determine the principal formation shear slowness by applying some kind of Slowness-Time-Coherency (STC) or Slowness-Frequency-Coherency (SFC) method to the fast and slow principal wave array data. The term array refers to the array of receivers. The smallest slowness will be labelled 'Fast' (F) and the other one 'Slow' (S).

When considering the quadrupole case (n=2), cf., Equation (27), four $\theta^F$-values may be obtained ( $$\frac{\pi}{4}$$

radians offset from one another). This implies that there are two undistinguishable fast angles, $$\frac{\pi}{2}$$

radians offset from one another and two undistinguishable slow angles, also $$\frac{\pi}{2}$$

radians offset from one another. The azimuthal offset between the fast and the slow angle is $$\frac{\pi}{4}$$

radians. This process may be duplicated by applying slowness processing to the resulting principal (quadrupole) wave array data. From this, two slowness values may be obtained, one smaller than the other. However, it is not possible to determine which of the two fast polarization angles the smaller slowness value applies to: $\theta^F$ or $$\theta^F + \frac{\pi}{2}.$$

Although this ambiguity cannot be resolved by means of the quadrupole data itself, it may be resolved by other measurements (e.g., dipole data, ultrasonic borehole imaging data, etc.). It is also noted that the angle ambiguity increases with increasing multipole order (n).

It is noted that Equation (28) depends on the (complex) frequency, s, and therefore is ambiguous. Although, in theory, the value for $\theta^F$ should be the same for all frequencies s, this will never be the case as a result of noise, mode contaminants, etc. Therefore, embodiments of the present disclosure are directed to a more robust measure through integration over a user selected frequency range of the varying pressure in the fluid-filled borehole detected by the multipole receivers. The final result can be expressed by:

$$\theta^F = \frac{1}{2n} \arctan\left[\sum_{k=1}^{N_{rec}} \int_{s \in Br} \left[\frac{\hat{p}_{XY}(z_k, s) + \hat{p}_{YX}(z_k, s)}{\hat{p}_{XX}(z_k, s) - \hat{p}_{YY}(z_k, s)}\right] ds\right] \quad (29)$$

where $z_k$ denotes the axial coordinate of the k-th multipole receiver relative to the (firing) transmitter position along the longitudinal axis of the downhole tool. The frequency range of the received pressure variations (acoustic signals) depends on the frequency of the acoustic signal transmitted by the multipole transmitter. The frequency of the acoustic signal transmitted by the multipole transmitter may be in the range of 1 KHz to 20 kHz, or 2 kHz to 12 kHz, or 2 kHz to 6 kHz. The frequency of the acoustic signal received by the multipole receivers may be in the range of 1 to 30 KHz or 2 to 20 KHz.

In applications where $\Delta\theta$ is not exactly known, Equation (25) may be used to build the following object function:

$$E(\theta^F, \Delta\theta) = \sum_{k=1}^{N_{rec}} \int_{s \in Br} \quad (30)$$

$$[\hat{p}_{XY}(z_k, s) + \hat{p}_{YX}(z_k, s) + \cot(n\Delta\theta)(\hat{p}_{YY}(z_k, s) - \hat{p}_{XX}(z_k, s))]$$

$$\cos(2n\theta^F) + [\hat{p}_{YY}(z_k, s) - \hat{p}_{XX}(z_k, s) -$$

$$\cot(n\Delta\theta)(\hat{p}_{XY}(z_k, s) + \hat{p}_{YX}(z_k, s))]\sin(2n\theta^F)ds$$

In Equation (30), Br is the so-called Bromwich contour. Using Equation (30), values of ($\theta^F$, $\Delta\theta$) that minimize object function E($\theta^F$, $\Delta\theta$) are determined. It is noted that the earlier explained angle ambiguity in case of n>1 remains.

After having determined the fast and slow principal polarization direction, Equation (23) is used to compute the fast and slow principal waves. The fast and slow principal waves are borehole guided and therefore dispersive in nature. An example of the first receiver quadrupole fast principal shear slowness is shown in FIG. 5B (upper plot) while the quadrupole slow principal shear slowness is shown in FIG. 5B (lower plot).

From FIG. 5B, it is clear that the fast and slow principal shear slowness values (dashed horizontal lines, respectively) are either reached at isolated frequencies only or are not reached at all. In addition, amplitudes of time domain principal waves (FIG. 5B) are low near the onset of the signal. Frequency-wise, this zone corresponds to the cut-off zone indicated in FIG. 5B. From this and the fact that the signal-to-noise ratio usually is low in this cut-off zone due to drilling noise, it is undesirable to use an STC method for the determination of the formation principal shear slownesses.

In view of this, some embodiments of the present disclosure are directed to using a generalized semblance method:

$$\rho(S_s^\odot) = \frac{1}{N_{rec}} \frac{\int_{s \in Br} \left|\sum_{j=1}^{N_{rec}} \exp[-ik_z(s, S_s^\odot, \ldots)][j-1]\Delta z]\hat{C}_j^\odot[s]\right|^2 ds}{\sum_{j=1}^{N_{rec}} \left[\int_{s \in Br} \left|\exp[-ik_z(s, S_s^\odot, \ldots)][j-1]\Delta z]\hat{C}_j^\odot[s]\right|^2 ds\right]} \quad (31)$$

where $N_{rec}$ denotes the total number of (multipole) receivers, $\Delta z$ denotes the inter-receiver spacing, s denotes the complex frequency, and $k_z(s, S_s^\odot, \ldots)$ is a model-based wavenumber along the borehole. This may be computed for HTI configurations and may be parametrized by several parameters, including, without limitation, elastic properties and densities of the tool, formation and borehole fluid, tool radius, and borehole radius. It is assumed that all of these parameters are known except for $S_s^\odot$, which represents the fast ($\odot$="F") or slow ($\odot$="S") formation shear slowness. Equation (31) may be applied to the fast and slow principal (multipole) wave array data, $\hat{C}_j^\odot$, where the subscript j denotes the receiver index in the array of receivers to which the principal wave $\hat{C}^\odot$ pertains. The principal formation shear slowness $S_s^\odot$ that maximizes the coherency function, $\rho(0\leq\rho\leq1)$, must be found.

Discussed above are embodiments having four-component and two-component multipole configurations in accordance with some embodiments of the present disclosure. The four-component multipole configuration consists of two multipole sources and two multipole receivers. The two-component multipole configuration consists of one multipole source and two multipole receivers.

In some embodiments of the present disclosure, configurations having one multipole transmitter (e.g., an X-multipole transmitter) combined with one multipole receiver (e.g., an X-multipole receiver) are provided. In such configurations, the fast and slow principal polarization directions can no longer be determined via Equation (25).

Figure 6A:
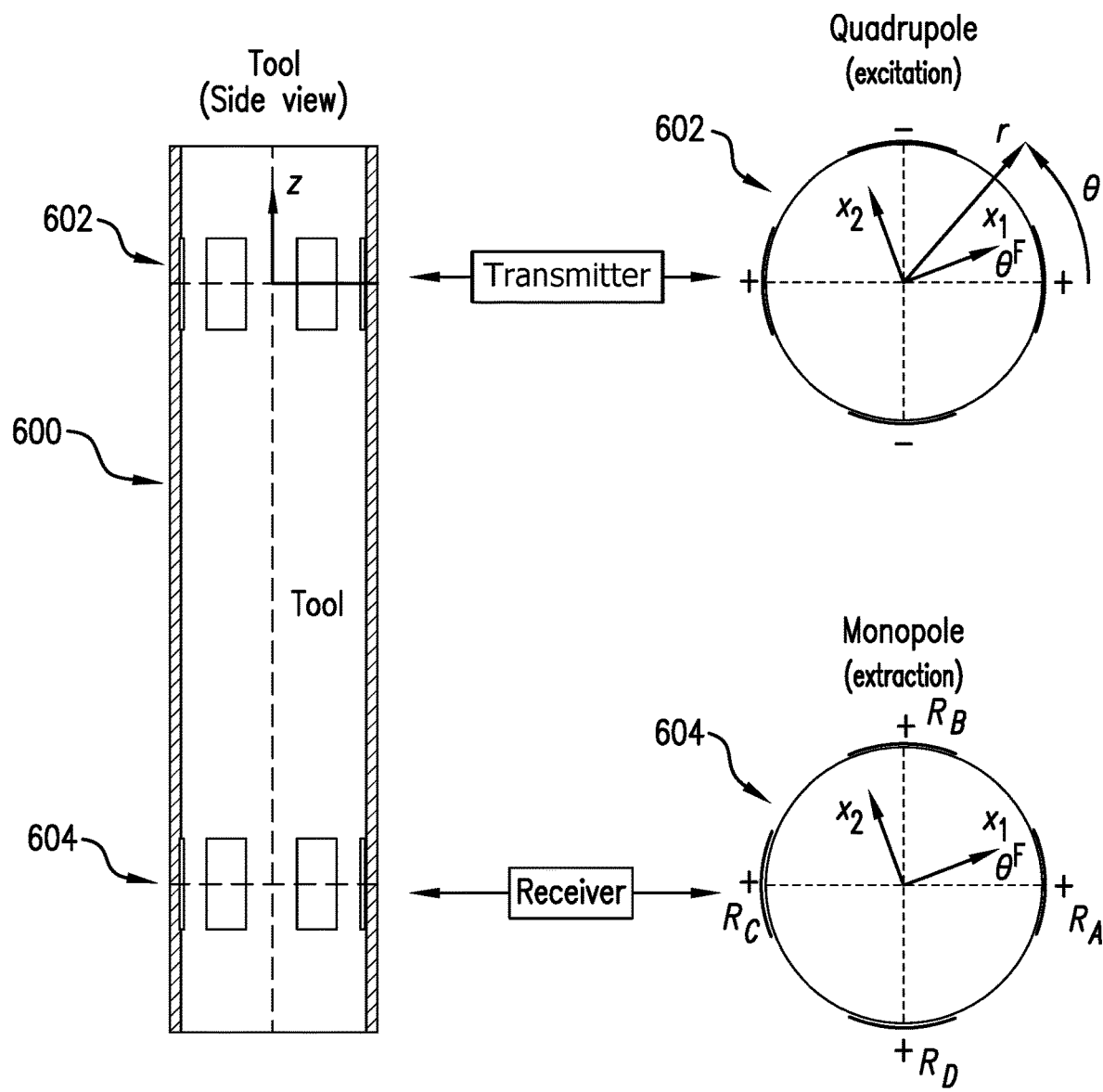
FIG. 6A is a schematic illustration of a downhole tool in accordance with an embodiment of the present disclosure.
Figure 6B:
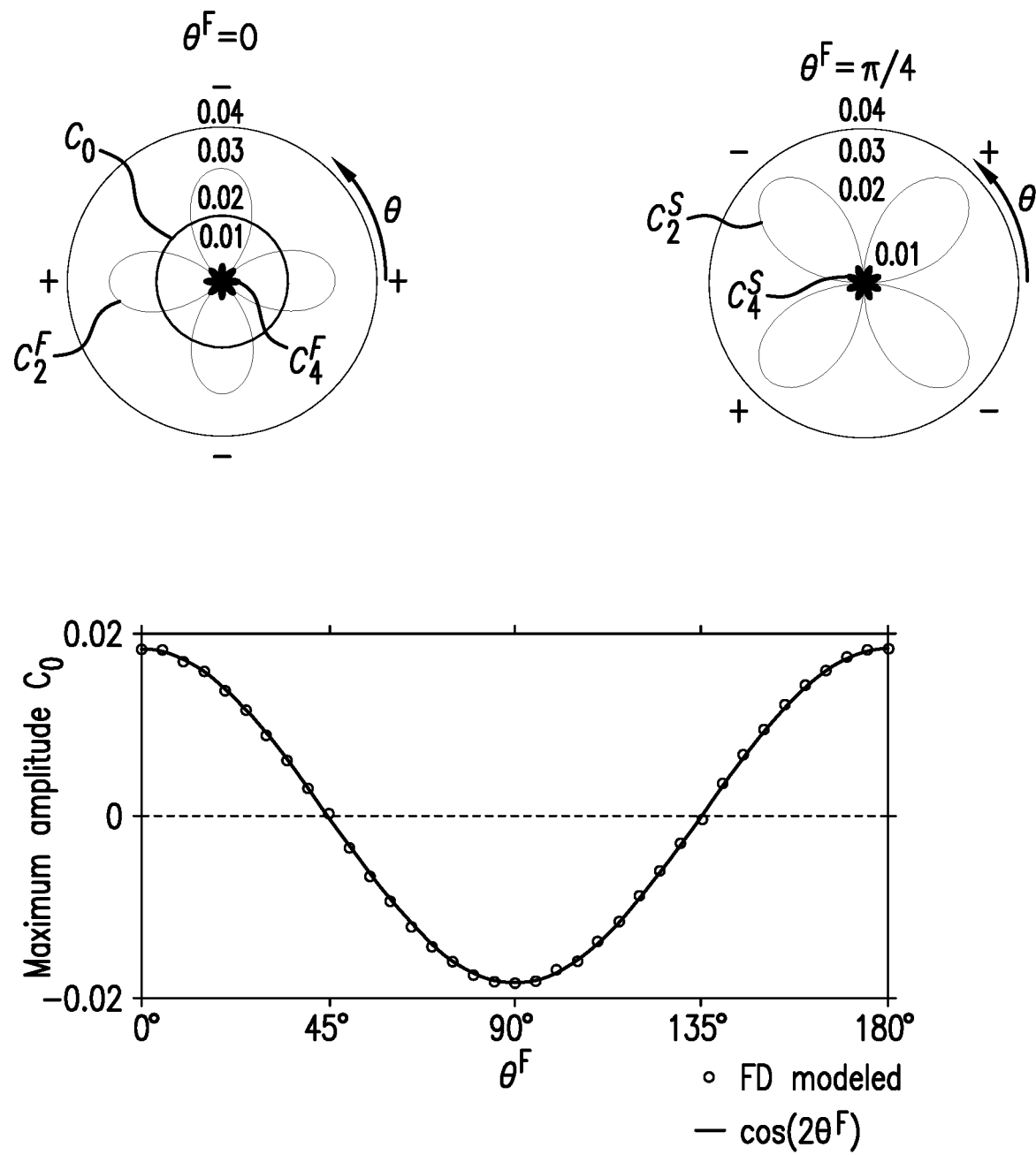
FIG. 6B is a schematic depiction of data obtained using the downhole tool of FIG. 6A.

Referring to FIGS. 6A-6B, illustrations of a tool 600 having a multipole transmitter 602 (e.g., quadrupole) and a monopole receiver 604 are shown. In the case of a quadrupole excitation in an HTI formation, the monopole cylinder wave will be excited. This is a unique HTI fingerprint as long as the tool is substantially centered in a substantially circular borehole. Although the monopole cylinder wave $\hat{C}_0(r, z, s)$ is, by definition, omnidirectional (i.e., does not depend on $\theta$), the amplitude depends on the X-quadrupole excitation direction relative to the fast principal direction $\theta^F$ (FIG. 6B). The following relationship may be derived from finite difference modeling:

$$\hat{C}_0(r,z,s,\theta^F) = \hat{C}_0^{max}(r,z,s)\cos[n\theta^F]; (n \text{ even}) \quad (32)$$

Equation (32) holds for arbitrary alternate polarity multipole excitation of order n as long as n is even. In the above noted configuration, the quadrupole configuration provides for: $\sigma=-1$; n=2. In FIG. 6B the situation is explained in more detail. The top panel shows two directivity patterns. Although both patterns show the excited quadrupole mode, they also show the two closest anisotropy induced mode contaminants: $\hat{C}_0$ and $\hat{C}_4$. However, in the top left panel of FIG. 6B, the quadrupole excitation direction is aligned with the fast principal direction ($\theta^F=0$). In the top right panel of FIG. 6B, the quadrupole excitation direction is aligned with the slow principal direction ( $$\theta^F = \frac{\pi}{4}$$

). Considering the monopole amplitude dependence on $\theta^F$ (cf. Equation (32)), the monopole amplitude vanishes whenever $$\theta^F = \frac{\pi}{4}$$

and $$\theta^F = \frac{3\pi}{4} (0 \le \theta^F \le \pi).$$

In this example, the maximum (time domain) amplitude of the Stoneley wave is used as far as the monopole cylindrical wave ($C_0$) is concerned.

With reference again to FIG. 6A, the monopole extraction from any of the $N_{rec}$ quadrupole receivers follows from simply stacking all azimuthal channels (e.g., $R_A+R_B+R_C+R_D$). Similarly, the quadrupole extraction follows from alternate polarity stacking of all azimuthal channels (e.g., $R_A-R_B+R_C-R_D$).

In order to extract the fast principal angle from the anisotropy induced wave array data, Equation (32) may be rewritten as:

$$\hat{C}_0(r,z,s,\theta_0)=\hat{C}_0^{max}(r,z,s)\cos[n(\theta_0-\theta^F)];(n \text{ even}) \quad (33)$$

where $\theta_0$ denotes the multipole excitation direction. Alternatively, Equation (33) may be written as:

$$\hat{C}_0(r,z,s,\theta_0)=A(s)\cos[n(\theta_0)]+B(s)\sin[n\theta_0];(n \text{ even}) \quad (34)$$

where $$\begin{bmatrix}A\\B\end{bmatrix}(s) = \hat{C}_0^{max}(r,z,s)\begin{bmatrix}\cos(n\theta^F)\\\sin(n\theta^F)\end{bmatrix};(n \text{ even}) \quad (35)$$

Integrating Equation (34) over a user-specified frequency range results in:

$$\hat{C}'_0(r,z,\theta_0)=A' \cos[n\theta_0]+B' \sin[n\theta_0];(n \text{ even}) \quad (36)$$

where $$\hat{C}'_0(r,z,\theta_0)=\int_{s\in Br}\hat{C}_0(r,z,s,\theta_0)ds \quad (37)$$

and $$A'=\int_{s\in Br}A(s)ds \quad (38)$$

and $$B'=\int_{s\in Br}B(s)ds \quad (39)$$

Integrating Equation (35) over the same frequency range, the following is obtained:

$$\begin{bmatrix}A'\\B'\end{bmatrix} = \begin{bmatrix}\cos(n\theta^F)\\\sin(n\theta^F)\end{bmatrix}\int_{s\in Br}\hat{C}_0^{max}(r,z,s)ds; (n \text{ even}) \quad (40)$$

And from Equation (40) it follows that:

$$\tan(n\theta^F)=B'/A' \quad (41)$$

From the above, in accordance with embodiments of the present disclosure, an algorithm or process for determining the fast principal angle from the quadrupole excitation (n=2) is provided.

Figure 7:
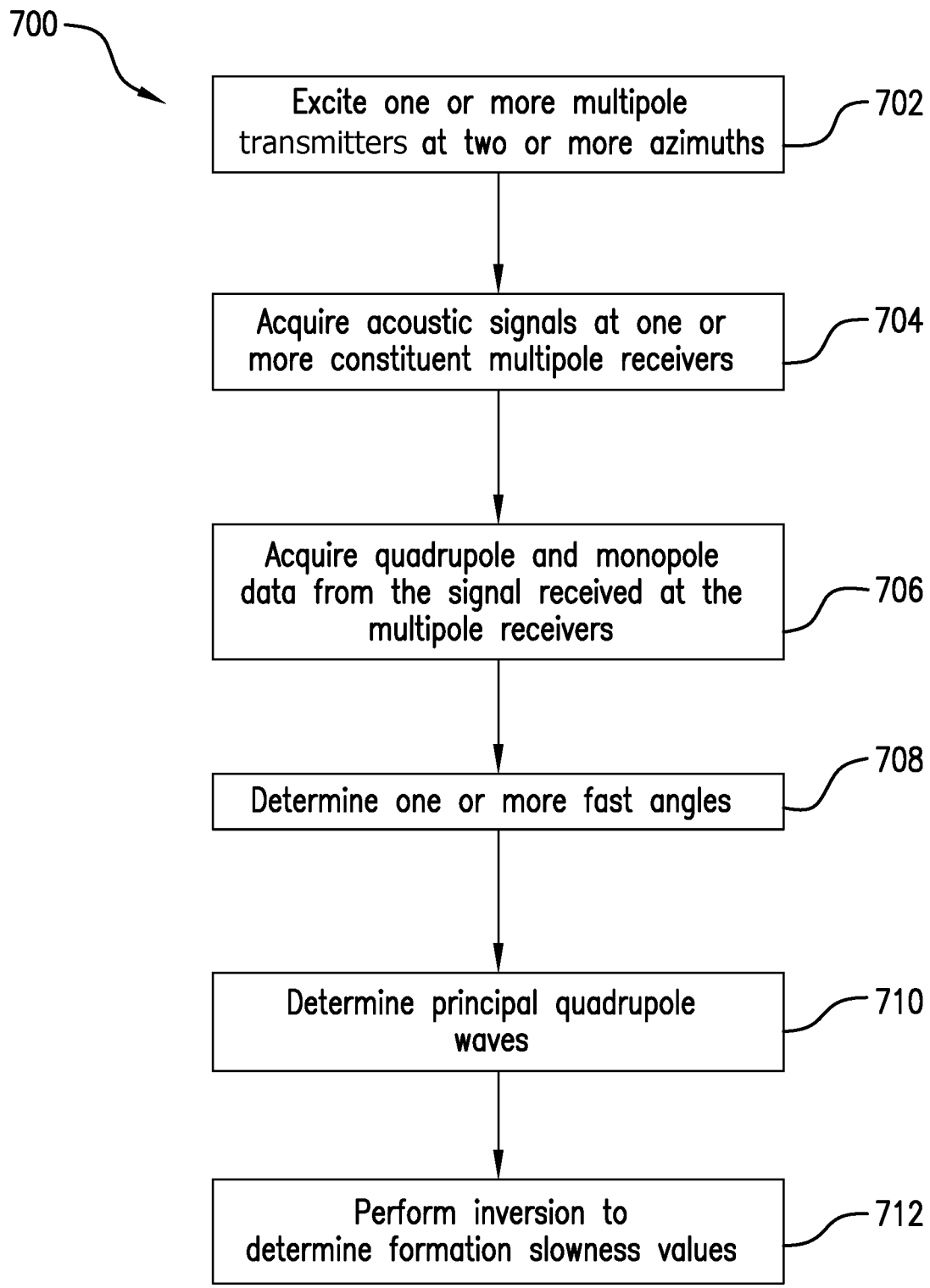
FIG. 7 is a flow process in accordance with an embodiment of the present disclosure.

For example, referring to FIG. 7, a flow process 700 for determining formation slowness using a multipole sensor system in accordance with an embodiment of the present disclosure is shown. The flow process 700 may be performed using multipole systems, as described above, and may incorporate downhole-based and/or earth surface-based data collection and data processing. The downhole-hole based and/or earth surface-based data collection and data processing may be performed during the borehole drilling process. The flow process 700 may be performed using a downhole tool and/or system configured with, at least, a multipole acoustic transmitter and a multipole receiver. In some configurations, the downhole tool may be part of a drill string and/or bottomhole assembly that is operated to perform measurements during while-drilling operations. It will be appreciated that the flow process 700 may be employed using any multipole sensor systems (order of n≥1), and the below description is merely for explanatory and illustrative purposes and is not intended to be limiting. It will be appreciated that an anisotropy induced monopole wave or wavefield is only generated for alternate polarity multipole excitations of order with n being even.

At block 702, the downhole tool having one or more multipole transmitters is excited. The multipole transmitter may be excited to generate acoustic signals at various (different) azimuthal angles ($\theta_0$) or angular positions of the downhole tool relative to a longitudinal tool axis. Such excitation may cause the one or more multipole transmitters to fire and thus generate an acoustic wave that is transmitted into a borehole (including drilling fluids) and/or formation.

At block 704, one or more multipole receivers of the downhole tool are configured to detect the acoustic signals (waves) generated by the one or more multipole transmitters. The detection may be of acoustic signals that have passed through the borehole (including drilling fluids) and/ or the formation.

At block 706, both multipole and monopole data are acquired from the signals received at the multipole receivers. The data acquisition may be obtained using appropriate stacking. In some configurations, a processor or other computational unit may be operably connected to the multipole receivers to receive data and/or information therefrom. In some embodiments, at block 706, a correction may be applied to account for tool rotation in the borehole. For example, in some embodiments of the present disclosure, a time-dependent amplitude correction may be applied, as described above.

At block 708, one or more fast angles are calculated. In some embodiments, the calculation may be performed downhole, using the processor or computational unit of the downhole tool. In other embodiments, the data may be transmitted to another downhole tool having a processor and/or computational unit, or such data may be transmitted or communicated uphole to the earth surface for processing. The calculation may involve solving Equation (36), above, in a least-squared sense to obtain A' and B'. From this, the fast angle(s) may be determined using Equation (41), above.

At block 710, the principal multipole waves are determined. Using a $\theta^F$-value from block 708 and the in-line multipole wave array data (e.g., "XX") at various azimuthal angles ($\theta_0$), the principal multipole waves may be computed in a least-squared sense, using Equation (9), in which the fast angle $\theta^F$ is replaced by $\theta_0-\theta^F$. This procedure may be executed on a frequency-by-frequency basis.

At block 712, an inversion is performed to determine the formation fast slowness values. For example, at block 712, each principal multipole wave determined at block 710 may be subjected to the generalized slant-stack procedure (cf. Equation (31)) in an iterative fashion, i.e., $S_s^\odot$ is changed until the (generalized) semblance value ($\rho(S_s^\odot)$) has attained a maximum.

Embodiments of the present disclosure are directed to downhole measurement systems and methods for determining acoustic azimuthal anisotropy of subsurface formations from the acoustic multipole data. The systems include a bottomhole assembly configured to drill through a formation. The bottomhole assembly may include a sensor assembly having at least one multipole transmitter for transmitting acoustic signals into the formation. A controller is configured to obtain acoustic data from at least two multipole receivers at various azimuthal orientations of the tool during a drilling operation of the bottomhole assembly. The two multipole receivers are arranged axially offset from the transmitter and axially offset from each other. From this information, the controller is configured to extract a monopole wave from the multipole receivers at the azimuth angles used to obtain the acoustic data at the multipole receivers. From this information, the controller may be configured to use the above described mathematics to extract principal shear waves using the multipole sensor system.

In accordance with embodiments of the present disclosure, the controller and/or processing described herein may be performed downhole and/or at the surface. For example, a downhole processor and/or controller may be configured to receive data from the sensors in real time and may perform real-time processing and/or post-receipt processing downhole. In some embodiments, the data collected downhole may be transmitted uphole, such as by telemetry or digital communication. Further still, in some embodiments, a tool may be deployed downhole, perform the described processes and then returned to the surface for post-acquisition processing at the surface (e.g., at the location of the system, at a remote location, etc.).

In some embodiments, the downhole measurement systems a bottomhole assembly configured to drill through a subsurface formation. A sensor assembly including one multipole transmitter (X-transmitter) for transmitting acoustic signals into a formation is provided. The sensor assembly also includes at least two, transmitter (azimuth) aligned, multipole receivers (X-receivers), axially offset from each other and axially offset from the X-transmitter. A controller of the bottomhole assembly (or located uphole, e.g., at the earth surface) is configured to obtain acoustic multipole data from the receivers at specific (e.g., user-defined or otherwise predetermined) azimuthal orientations of the tool during a drilling operation of the bottomhole assembly.

From this, the controller can extract monopole data from the multipole receivers at the azimuthal angles used for data acquisition, in a selected frequency range. The controller will then determine the fast angle (e.g., using Equation (34) in the least-squared sense to solve for A and B in a selected frequency range and use these results to find the fast angle).

Given the fast angle, Equation (5) (or Equation (8)) may be used to determine the fast and slow principal wave in the least-squared sense in the selected frequency range from the obtained multipole data. The principal waves may then be subjected to a model-based, Slowness-Coherency method to obtain the fast and slow formation shear slowness (e.g., using Equation (31)). The smallest of the two slowness values is associated with the fast angle, although the angle ambiguity may remain.

In some embodiments, the multipole receiver may be augmented by a second multipole receiver (e.g., Y-receiver), which is azimuthally offset from the X-receiver by a known azimuthal angle (e.g., $\pi/4$ radians). In some such embodiments, while committing to a specific X-transmitter azimuth (e.g., $\theta_k$) firing scheme: $\theta_k=\beta+k(\pi/4N)$, $k=0,1,\ldots,8N-1$ where $N\geq 1(N\in\mathbb{N})$ and where $\beta$ is an arbitrary reference angle. The reference angle $\beta$ is selected to guarantee that with each azimuth, $\theta_k$, an azimuth, $\theta_k+(\pi/4)$, can be associated. Where the XX and XY multipole data is associated with the X-multipole transmitter firing at azimuth, $\theta_k$, and the corresponding multipole data acquisition at the X-multipole and Y-multipole receivers, respectively, the 'missing' YX and YY multipole data is obtained through association of the X-multipole transmitter firing at azimuth, $\theta_k+(\pi/4)$, with the corresponding multipole data acquisition at the Y-multipole and X-multipole receiver, respectively.

In some embodiments, the transmitter firing scheme may be arbitrary and the data grouping (four component matrix) follows the following scheme: Where the XX and XY multipole data is associated with the X-multipole transmitter firing at arbitrary azimuth, $\theta$, and the corresponding multipole data acquisition at the corresponding X-multipole and Y-multipole receivers, respectively, the 'missing' YX and YY multipole data is obtained through firing the X-multipole at azimuth, $\theta+\Delta\theta$, with the corresponding multipole data acquisition at the Y-multipole and X-multipole receivers, respectively.

The four component data-matrix (Cf. Equation (10)) may be diagonalized (using Equation (13)) in a selected frequency range, in order to minimize the energy contained in the cross components (XY & YX), thereby obtaining the fast angle (Equation (20)). The fast angle may then be used to compute the principal waves at all axial receiver locations (Equation (13)).

In some embodiments, the four component data-matrix (Cf. Equation (20)) may be diagonalized (using Equation (23)) in a selected frequency range. This may be done to minimize the energy contained in the cross components (XY & YX), thereby obtaining the fast angle and $\Delta\theta$ (Cf. Equation (30)). The fast angle and $\Delta\theta$ can then be used to compute the principal waves at all axial receiver locations (Equation (23)). The principal waves (as obtained from any of the above processes) may be subjected to a model-based, Slowness-Coherency method to obtain the fast and slow formation shear slowness (e.g., Equation (31)). The smallest of the two slowness values may then be associated with the fast angle.

Advantageously, embodiments provided herein are directed to systems and methods configured to obtain acoustic LWD-multipole measurements and processing methods associated therewith to determine angle(s) and magnitude(s) of acoustic azimuthal anisotropy. As such, embodiments of the present disclosure are directed to determining fast and slow formation shear slowness and associated direction(s) in while-drilling applications. Such information may be used in a variety of applications, including and without limitation, fracture characterization, wellbore stability, geosteering, rock mechanical properties, post-drilling completion planning, and the like. Using multiple sensors (e.g., multipole sensor arrays, including but not limited to quadrupole arrays) enables extraction and determination of such information during while-drilling operations.

In accordance with embodiments of the present disclosure, different sensor array configurations may be employed without departing from the scope of the present disclosure. For example, without limitation, full cross-quadrupole applications, pseudo cross-quadrupole applications, and in-line quadrupole applications, and other multipole configurations of order n≥1 are all encompassed by the present disclosure. These are different measurement configurations that aim to achieve the same thing. Specifically, each of these different applications/configurations enables determination of fast and slow angle(s) and thus determination of orientation of an HTI symmetry axis. As discussed above, this is sometimes referred to as anisotropy direction. Further, from the fast and slow formation shear wave determination, the relative difference between the two slowness values may be used to determine an anisotropy magnitude.

Embodiment 1: A downhole measurement system comprising: a bottomhole assembly configured to drill through a formation: a sensor assembly comprising: a multipole transmitter configured to transmit acoustic signals into the formation, the multipole transmitter located at an azimuthal position on an exterior of the bottomhole assembly, wherein the multipole transmitter is of order n≥2; and a first multipole receiver and, at least, a second multipole receiver, wherein each of the first and second multipole receivers are azimuthally aligned with the multipole transmitter, are axially offset from the multipole transmitter, and are axially offset from each other along the exterior of the bottomhole assembly, wherein the order of the first and second multipole receivers are equal to the order of the multipole transmitter; and a controller configured to obtain acoustic multipole data from each of the first multipole receiver and the second multipole receiver at one or more azimuthal angles of the bottomhole assembly during a drilling operation, wherein the controller is configured to determine acoustic azimuthal anisotropy of the formation from the acoustic multipole data.

Embodiment 2: The downhole measurement system of any embodiment herein, wherein the controller is further configured to extract monopole data from the acoustic multipole receivers at the azimuthal angles.

Embodiment 3: A downhole measurement system comprising: a bottomhole assembly configured to drill through a formation, the bottomhole assembly comprising a circumference and a longitudinal axis, the bottomhole assembly configured to rotate in the formation: a sensor assembly comprising: a multipole transmitter configured to transmit acoustic signals into the formation, the multipole transmitter located on or at the bottomhole assembly, wherein the multipole transmitter is of order n≥2; and a first multipole receiver and a second multipole receiver, located in, on, or at the bottomhole assembly, wherein each of the first and second multipole receivers are circumferentially aligned with the multipole transmitter, are axially offset from the multipole transmitter, and are axially offset from each other along the longitudinal axis of the bottomhole assembly, wherein the first multipole receiver and the second multipole receiver are of order n≥2; and a controller configured to obtain first acoustic multipole data from the first multipole receiver and second acoustic multipole data form the second multipole receiver at one or more azimuthal angles of the rotation of the bottomhole assembly, wherein the controller is configured to determine acoustic azimuthal anisotropy of the formation using the first acoustic multipole data and the second acoustic multipole data.

Embodiment 4: The downhole measurement system of any embodiment herein, wherein the controller is further configured to extract monopole data using the first acoustic multipole data and the second acoustic multipole data.

Embodiment 5: The downhole measurement system of any embodiment herein, wherein the multipole transmitter is an X-direction multipole transmitter and the first multipole receiver and the second multipole receiver are respective first and second X-direction multipole receivers, the downhole measurement system further comprising at least one Y-direction multipole receiver.

Embodiment 6: The downhole measurement system of any embodiment herein, wherein the at least one Y-direction multipole receiver is offset from the X-direction multipole receivers by a circumferential offset on the bottomhole assembly.

Embodiment 7: The downhole measurement system of any embodiment herein, wherein the circumferential offset is equal to $\pi/2n$ radians, wherein n is the order of the multipole transmitter.

Embodiment 8: The downhole measurement system of any embodiment herein, wherein the at least one Y-direction multipole receiver and at least one of the X-direction multipole receivers are arranged at the same axial offset along the longitudinal axis of the bottomhole assembly relative to the multipole transmitter.

Embodiment 9: The downhole measurement system of any embodiment herein, wherein the order of the first multipole receiver and the second multipole receiver are equal to the order of the multipole transmitter.

Embodiment 10: The downhole measurement system of any embodiment herein, wherein the first acoustic multipole data and the second acoustic multipole data are arranged in a four component data matrix, wherein the four component data matrix is diagonalized in a frequency range of the obtained first acoustic multipole data and the second acoustic multipole data to minimize a cross-line energy and obtain at least one of a formation fast angle and a formation slow angle.

Embodiment 11: The downhole measurement system of any embodiment herein, further comprising computing at least one of a fast principal wave and a slow principal wave using a rotation matrix and an offset matrix.

Embodiment 12: The downhole measurement system of any embodiment herein, wherein the controller is configured to determine at least one of a formation fast angle and a formation slow angle using the first acoustic multipole data and the second acoustic multipole data.

Embodiment 13: A method for making measurements downhole, the method comprising: deploying a bottomhole assembly into a formation: transmitting, using a multipole transmitter, transmitted acoustic signals into the formation, the multipole transmitter located in, on, or at the bottomhole assembly, wherein the multipole transmitter is of order n≥2: receiving, at a first multipole receiver and at a second multipole receiver, received acoustic signals, wherein each of the first and second multipole receivers are circumferentially aligned with the multipole transmitter, and are axially offset from the multipole transmitter, and are axially offset from each other along a longitudinal axis of the bottomhole assembly, wherein the first and second multipole receivers are of order n≥2; obtaining, using a controller, first acoustic multipole data from the first multipole receiver and second multipole data from the second multipole receiver at one or more azimuthal angles of a rotation of the bottomhole assembly in the formation during a drilling operation; and determining acoustic azimuthal anisotropy of the formation from the first acoustic multipole data and the second acoustic multipole data.

Embodiment 14: The method of any embodiment herein, further comprising extracting monopole data using the first acoustic multipole data and the second acoustic multipole data.

Embodiment 15: The method of any embodiment herein, wherein the monopole data is extracted at one or more frequency ranges of the obtained first acoustic multipole data and the obtained second acoustic multipole data.

Embodiment 16: The method of any embodiment herein, wherein at least one of a formation fast angle and a formation slow angle is determined from the monopole data.

Embodiment 17: The method of any embodiment herein, further comprising determining at least one of a fast principal wave and a slow principal wave of the formation from at least one of the formation fast angle and the formation slow angle.

Embodiment 18: The method of any embodiment herein, further comprising determining at least one of a fast formation shear slowness and a slow formation shear slowness based on at least one of the fast principal wave and the slow principal wave.

Embodiment 19: The method of any embodiment herein, further comprising determining at least one of a formation fast angle and a formation slow angle using the obtained first acoustic multipole data and the obtained second acoustic multipole data.

Embodiment 20: The method of any embodiment herein, further comprising determining at least one of a fast principal wave and a slow principal wave of the formation based on the at least one of the formation fast angle and the formation slow angle.

Embodiment 21: The method of any embodiment herein, wherein the first multipole receiver receives the first acoustic multipole data at a first axial position and the second multipole receiver receives the second acoustic multipole data at a second axial position, and at least one of the fast principle wave and the slow principal wave is determined at the respective first axial position and the second axial position.

Embodiment 22: The method of any embodiment herein, further including subjecting the determined at least one of the fast principal wave and the slow principal wave to a model-based, Slowness-Coherency method to obtain at least one of a fast formation shear slowness and a slow formation shear slowness.

In support of the teachings herein, various analysis components may be used including a digital and/or an analog system. For example, controllers, computer processing systems, and/or geo-steering systems as provided herein and/or used with embodiments described herein may include digital and/or analog systems. The systems may have components such as processors, storage media, memory, inputs, outputs, communications links (e.g., wired, wireless, optical, or other), user interfaces, software programs, signal processors (e.g., digital or analog) and other such components (e.g., such as resistors, capacitors, inductors, and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (e.g., ROMs, RAMs), optical (e.g., CD-ROMs), or magnetic (e.g., disks, hard drives), or any other type that when executed causes a computer to implement the methods and/or processes described herein. These instructions may provide for equipment operation, control, data collection, analysis and other functions deemed relevant by a system designer, owner, user, or other such personnel, in addition to the functions described in this disclosure. Processed data, such as a result of an implemented method, may be transmitted as a signal via a processor output interface to a signal receiving device. The signal receiving device may be a display monitor or printer for presenting the result to a user. Alternatively, or in addition, the signal receiving device may be memory or a storage medium. It will be appreciated that storing the result in memory or the storage medium may transform the memory or storage medium into a new state (i.e., containing the result) from a prior state (i.e., not containing the result). Further, in some embodiments, an alert signal may be transmitted from the processor to a user interface if the result exceeds a threshold value.

Furthermore, various other components may be included and called upon for providing for aspects of the teachings herein. For example, a sensor, transmitter, receiver, transceiver, antenna, controller, optical unit, electrical unit, and/or electromechanical unit may be included in support of the various aspects discussed herein or in support of other functions beyond this disclosure.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the present disclosure.

The teachings of the present disclosure may be used in a variety of well operations. These operations may involve using one or more treatment agents to treat a formation, the fluids resident in a formation, a borehole, and/or equipment in the borehole, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While embodiments described herein have been described with reference to various embodiments, it will be understood that various changes may be made, and equivalents may be substituted for elements thereof without departing from the scope of the present disclosure. In addition, many modifications will be appreciated to adapt a particular instrument, situation, or material to the teachings of the present disclosure without departing from the scope thereof. Therefore, it is intended that the disclosure is not limited to the particular embodiments disclosed as the best mode contemplated for carrying the described features, but that the present disclosure will include all embodiments falling within the scope of the appended claims.

Accordingly, embodiments of the present disclosure are not to be seen as limited by the foregoing description but are only limited by the scope of the appended claims.

What is claimed is:

1. A downhole measurement system comprising:
    a bottomhole assembly configured to drill a borehole through a formation, the bottomhole assembly comprising a circumference and a longitudinal axis, the bottomhole assembly configured to rotate in the formation around the longitudinal axis by an azimuthal angle;
    a sensor assembly configured to provide four component cross multipole measurements, the sensor assembly comprising:
    at least one multipole transmitter configured to transmit acoustic signals at a first azimuthal angle and a second azimuthal angle of the rotation of the bottomhole assembly into the formation, the at least one multipole transmitter located in, on, or at the bottomhole assembly, wherein the at least one multipole transmitter is of order n≥1; and
    a first multipole receiver and a second multipole receiver, located on or at the bottomhole assembly, wherein the first multipole receiver is circumferentially aligned with the at least one multipole transmitter and the second multipole receiver is circumferentially offset from the first multipole receiver, wherein the first and second multipole receivers are axially offset from the at least one multipole transmitter along the longitudinal axis of the bottomhole assembly, wherein the first multipole receiver and the second multipole receiver are of order n≥1; and
    a controller configured to obtain first acoustic multipole data and second acoustic multipole data from the first multipole receiver, and third acoustic multipole data and fourth acoustic multipole data from the second multipole receiver, wherein the first and third acoustic multipole data are based on acoustic signals transmitted at the first azimuthal angle and the second and fourth acoustic multipole data are based on acoustic signals transmitted at the second azimuthal angle,
    wherein the controller is configured to determine acoustic azimuthal anisotropy of the formation using the first, second, third, and fourth acoustic multipole data, a fast principal wave and a slow principal wave, wherein the fast principal wave and the slow principal wave are determined by using:

$$\hat{G}_n(r,z,s) = R^T(n\theta^F) Q^{-1}(n\Delta\theta) \hat{P}'(r,z,s) R(n\theta^F)$$

wherein n is the order of the at least one multipole transmitter, $\hat{G}_n$ is a principal wave matrix, R is a rotation matrix, Q is an offset matrix, θ is an azimuthal angle, $\theta^F$ is an azimuthal angle of the fast polarization direction, $\hat{P}'$ is an acoustic pressure data matrix, r is a radial position in the borehole, z is an axial location in the borehole, and s is a complex frequency.

2. The downhole measurement system of claim 1, wherein the controller is further configured to extract monopole data using the first, second, third, and fourth acoustic multipole data.

3. The downhole measurement system of claim 1, wherein the at least one multipole transmitter is an X-direction multipole transmitter and the first multipole receiver is an X-direction multipole receiver and the second multipole receiver is a Y-direction multipole receiver.

4. The downhole measurement system of claim 1, wherein the circumferential offset is equal to $$\frac{\pi}{2n}$$

radians, wherein n is the order of the at least one multipole transmitter.

5. The downhole measurement system of claim 3, wherein the Y-direction multipole receiver and the X-direction multipole receiver are arranged at the same axial offset along the longitudinal axis of the bottomhole assembly relative to the at least one multipole transmitter.

6. The downhole measurement system of claim 3, wherein the first, second, third, and fourth acoustic multipole data are arranged in a four component data matrix, the four component data matrix is diagonalized in a frequency range of the obtained first, second, third, and fourth acoustic multipole data to minimize a cross-line energy and obtain at least one of a formation fast angle and a formation slow angle.

7. The downhole measurement system of claim 1, wherein the order n of the first multipole receiver and the second multipole receiver are equal to the order of the at least one multipole transmitter.

8. The downhole measurement system of claim 1, wherein the controller is configured to determine at least one of a formation fast angle and a formation slow angle using the first, second, third, and fourth acoustic multipole data.

9. The downhole measurement system of claim 1, wherein the at least one multipole transmitter comprises a first multipole transmitter and a second multipole transmitter, wherein the first multipole receiver is circumferentially aligned with the first multipole transmitter and the second multipole receiver is circumferentially aligned with the second multipole transmitter.

10. The downhole measurement system of claim 1, wherein the at least one multipole transmitter is of order n≥2.

11. The downhole measurement system of claim 1, wherein the controller is configured to obtain the first and third acoustic multipole data at a first time $t_1$ and obtains the second and fourth acoustic multipole data at a second time $t_2$, and the bottom hole assembly rotates around the longitudinal axis by an angle Δθ in the time interval $\Delta t = t_2 - t_1$.

12. A method for making measurements downhole, the method comprising:
    deploying a bottomhole assembly defining a longitudinal axis into a formation;
    rotating the bottomhole assembly around the longitudinal axis by an azimuthal angle;
    transmitting acoustic signals into the formation at a first azimuthal angle and a second azimuthal angle, using at least one multipole transmitter, the at least one multipole transmitter located in, on, or at the bottomhole assembly, wherein the at least one multipole transmitter is of order n≥1;
    receiving acoustic signals from the formation at a first multipole receiver and at a second multipole receiver, wherein the first multipole receiver is circumferentially aligned with the at least one multipole transmitter and the second multipole receiver is circumferentially offset from the first multipole receiver, and the first and second multipole receivers are axially offset from the at least one multipole transmitter along the longitudinal axis of the bottomhole assembly, wherein the first and second multipole receivers are of order n≥1;

obtaining, during a drilling operation and using a controller, first acoustic multipole data and second acoustic multipole data from the first multipole receiver and third acoustic multipole data and fourth acoustic multipole data from the second multipole receiver, wherein the first and third acoustic multipole data are based on acoustic signals transmitted at the first azimuthal angle and the second and fourth acoustic multipole data are based on acoustic signals transmitted at the second azimuthal angle; and determining acoustic azimuthal anisotropy of the formation from the first, second, third, and fourth acoustic multipole data, a fast principal wave and a slow principal wave, wherein the fast principal wave and the slow principal wave are determined by using:

$$\hat{G}_n(r,z,s)=R^T(n\theta^F)Q^{-1}(n\Delta\theta)\hat{P}'(r,z,s)R(n\theta^F)$$

wherein n is the order of the at least one multipole transmitter, $\hat{G}_n$ is a principal wave matrix, R is a rotation matrix, Q is an offset matrix, θ is an azimuthal angle, $\theta^F$ is an azimuthal angle of the fast polarization direction, $\hat{P}'$ is an acoustic pressure data matrix, r is a radial position in the borehole, z is an axial location in the borehole, and s is a complex frequency.

13. The method of claim 12, further comprising extracting monopole data using the first, second, third, and fourth acoustic multipole data.

14. The method of claim 13, wherein the monopole data is extracted at one or more frequency ranges of the obtained first, second, third, and fourth acoustic multipole data.

15. The method of claim 13, wherein at least one of a formation fast angle and a formation slow angle is determined from the monopole data.

16. The method of claim 12, further comprising determining at least one of a fast formation shear slowness and a slow formation shear slowness based on at least one of the fast principal wave and the slow principal wave.

17. The method of claim 12, further comprising determining at least one of a formation fast angle and a formation slow angle using the obtained first, second, third, and fourth acoustic multipole data.

18. The method of claim 12, further including subjecting the determined at least one of the fast principal wave and the slow principal wave to a model-based Slowness-Coherency method to obtain at least one of a fast formation shear slowness and a slow formation shear slowness.

19. The method of claim 12, wherein the at least one multipole transmitter is of order n≥2.

20. The method of claim 12, wherein obtaining acoustic multipole data includes obtaining the first and third acoustic multipole data at a first time $t_1$ and obtaining the second and fourth acoustic multipole data at a second time $t_2$, and rotating the bottom hole assembly around the longitudinal axis by an angle Δθ in the time interval $\Delta t = t_2 - t_1$.

* * * * *